US010228810B2

United States Patent
Shin et al.

(10) Patent No.: US 10,228,810 B2
(45) Date of Patent: Mar. 12, 2019

(54) METHOD OF TRANSMITTING INQUIRY MESSAGE, DISPLAY DEVICE FOR THE METHOD, METHOD OF SHARING INFORMATION, AND MOBILE TERMINAL

(71) Applicant: SAMSUNG ELECTRONICS CO., LTD., Suwon-si, Gyeonggi-do (KR)

(72) Inventors: In-young Shin, Seoul (KR); Won-jong Choi, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 13/950,916

(22) Filed: Jul. 25, 2013

(65) Prior Publication Data

US 2014/0033050 A1 Jan. 30, 2014

(30) Foreign Application Priority Data

Jul. 26, 2012 (KR) ........................ 10-2012-0081966

(51) Int. Cl.
*G06F 3/0481* (2013.01)
*G06F 3/048* (2013.01)
(Continued)

(52) U.S. Cl.
CPC .......... *G06F 3/048* (2013.01); *H04M 1/7253* (2013.01); *H04N 21/4126* (2013.01);
(Continued)

(58) Field of Classification Search
CPC .... G06F 3/048; G06F 3/04812; G06F 3/0484; H04M 1/7253; H04N 21/482;
(Continued)

(56) References Cited

U.S. PATENT DOCUMENTS 5,774,674 A * 6/1998 Gutmann et al. ............. 709/237
6,314,569 B1 * 11/2001 Chernock ............ H04N 21/431
715/723
(Continued)

FOREIGN PATENT DOCUMENTS

CN 101931427 A 12/2010
EP 2 107 800 A1 10/2009
(Continued)

OTHER PUBLICATIONS

"display", "input", "user" definitions: IEEE 100, The Authoritative Dictionary of IEEE Standards Terms, 7th edition, copyright 2000 by the Institute of Electrical and Electronics Engineers. ISBN 0-7381-2601-2, pp. 323-325, 525, 556-558, 1241-1242.*
(Continued)

*Primary Examiner* — Steven P Sax
(74) *Attorney, Agent, or Firm* — Staas & Halsey LLP

(57) ABSTRACT

A method of transmitting an inquiry message, performed by a display device, includes operations of reproducing content in the display device; receiving an input from a user, wherein the input from the user is related to the content; generating an inquiry message about the content, based on the input from the user; extracting information, which is related to the input from the user, from the content; and transmitting the extracted information and the inquiry message to an external device that is connected with the display device.

67 Claims, 21 Drawing Sheets

(51) Int. Cl.
*H04M 1/725* (2006.01)
*H04N 21/41* (2011.01)
*H04N 21/422* (2011.01)
*H04N 21/4363* (2011.01)
*H04N 21/4722* (2011.01)
*H04N 21/475* (2011.01)
*H04N 21/4788* (2011.01)

(52) U.S. Cl.
CPC . *H04N 21/42204* (2013.01); *H04N 21/43637* (2013.01); *H04N 21/4722* (2013.01); *H04N 21/4758* (2013.01); *H04N 21/4788* (2013.01)

(58) Field of Classification Search
CPC ...... H04N 21/485; H04N 21/41; H04N 21/42; H04N 21/43; H04N 21/47; G11B 27/031
USPC ................................. 715/733, 758, 751–753
See application file for complete search history.

(56) References Cited

U.S. PATENT DOCUMENTS

| | | | |
|---|---|---|---|
| 6,411,988 B1* | 6/2002 | Tafoya et al. | 709/204 |
| 6,549,751 B1* | 4/2003 | Mandri | 434/350 |
| 7,010,761 B2 | 3/2006 | Chatani et al. | |
| 7,398,470 B2* | 7/2008 | Keane | 715/733 |
| 7,995,064 B2* | 8/2011 | Guymon et al. | 345/473 |
| 8,156,442 B2* | 4/2012 | Aoki et al. | 715/753 |
| 8,352,873 B2* | 1/2013 | Craig et al. | 715/753 |
| 8,463,248 B2* | 6/2013 | Yu et al. | 455/414.1 |
| 8,464,164 B2* | 6/2013 | Hon et al. | 715/753 |
| 8,572,652 B2* | 10/2013 | Kim | H04N 21/4314 725/151 |
| 8,688,869 B2 | 4/2014 | Choi et al. | |
| 8,881,040 B2* | 11/2014 | Li | 715/764 |
| 9,544,544 B2 | 1/2017 | Choi et al. | |
| 2002/0056123 A1* | 5/2002 | Liwerant | H04M 3/567 725/87 |
| 2002/0100063 A1* | 7/2002 | Herigstad et al. | 725/141 |
| 2004/0040042 A1* | 2/2004 | Feinleib | 725/112 |
| 2004/0111488 A1* | 6/2004 | Allan | G06F 17/30899 709/217 |
| 2006/0206915 A1 | 9/2006 | Maeda et al. | |
| 2006/0206917 A1* | 9/2006 | Maeda et al. | 725/151 |
| 2007/0071413 A1* | 3/2007 | Takahashi | G11B 27/005 386/230 |
| 2007/0168413 A1* | 7/2007 | Barletta | G06F 3/04883 709/203 |
| 2008/0086688 A1* | 4/2008 | Chandratillake | G06F 17/30817 715/719 |
| 2008/0177875 A1* | 7/2008 | Denney | G06Q 50/188 709/224 |
| 2009/0048773 A1* | 2/2009 | Jarventie | G01C 21/20 701/533 |
| 2009/0083809 A1* | 3/2009 | Hayashi | H04N 5/783 725/88 |
| 2009/0125559 A1* | 5/2009 | Yoshino | G11B 27/322 |
| 2009/0193463 A1* | 7/2009 | Choi et al. | 725/40 |
| 2009/0248914 A1* | 10/2009 | Choi et al. | 710/33 |
| 2009/0307614 A1* | 12/2009 | Craig | G06Q 10/107 715/758 |
| 2010/0042682 A1* | 2/2010 | Kaye | G11B 27/034 709/203 |
| 2010/0077289 A1* | 3/2010 | Das | G06F 17/30265 715/230 |
| 2010/0257549 A1 | 10/2010 | Nam | |
| 2011/0047388 A1* | 2/2011 | Park | G06F 21/6209 713/189 |
| 2011/0106841 A1* | 5/2011 | Cao | G06F 17/30286 707/769 |
| 2011/0130172 A1 | 6/2011 | Rao | |
| 2012/0166970 A1* | 6/2012 | Gastaldi | G06Q 10/10 715/753 |
| 2012/0265901 A1* | 10/2012 | Swenson | H04L 65/1076 709/246 |
| 2012/0278736 A1* | 11/2012 | Tran et al. | 715/753 |
| 2013/0086487 A1* | 4/2013 | Findlay | H04N 7/15 715/753 |
| 2013/0145285 A1* | 6/2013 | Klinger et al. | 715/753 |
| 2013/0198791 A1* | 8/2013 | Yun | H04N 21/4122 725/112 |
| 2013/0212255 A1* | 8/2013 | Chao | H04L 41/083 709/224 |
| 2013/0254071 A1* | 9/2013 | Oley | G06Q 30/06 705/26.42 |
| 2014/0087770 A1* | 3/2014 | Cho | H04W 4/02 455/457 |

FOREIGN PATENT DOCUMENTS

| | | |
|---|---|---|
| EP | 2 262 238 A2 | 12/2010 |
| KR | 10-2009-0067635 | 6/2009 |
| KR | 10-2009-0083064 | 8/2009 |
| KR | 10-2009-0104292 | 10/2009 |
| KR | 10-2010-0104702 | 9/2010 |
| KR | 10-2012-0004650 | 1/2012 |

OTHER PUBLICATIONS

Frame, Semantics, Syntax. IEEE 100, The Authoritative Dictionary of IEEE Standards Terms, 7th edition, copyright 2000 by the Institute of Electrical and Electronics Engineers. ISBN 0-7381-2601-2. pp. 455, 1021, 1143.*
Content, Inquiry. (2011). The American Heritage Dictionary of the English language. Boston, MA: Houghton Mifflin. Retrieved from http://search.credoreference.com/content/entry/hmdictenglang/content_1/0 . . . /inquiry/0 4 pgs.*
Ontology. (2004). In W. Bainbridge (Ed.), Berkshire Encyclopedia of human-computer interaction. Great Barrington, MA: Berkshire Publishing Group. Retrieved from http://search.credoreference.com/content/entry/berkencyhci/ontology/0 5 pgs.*
PCT International Search Report dated Oct. 25, 2013 in corresponding International Application No. PCT/KR2013/006006.
Extended European Search Report dated Oct. 13, 2016 in corresponding European Patent Application No. 13175365.9.
Chinese Office Action dated Apr. 7, 2017 in corresponding Chinese Patent Application No. 201380039703.9.
Korean Office Action dated Nov. 21, 2018 in Korean Patent Application No. 10-2012-0081966.

* cited by examiner

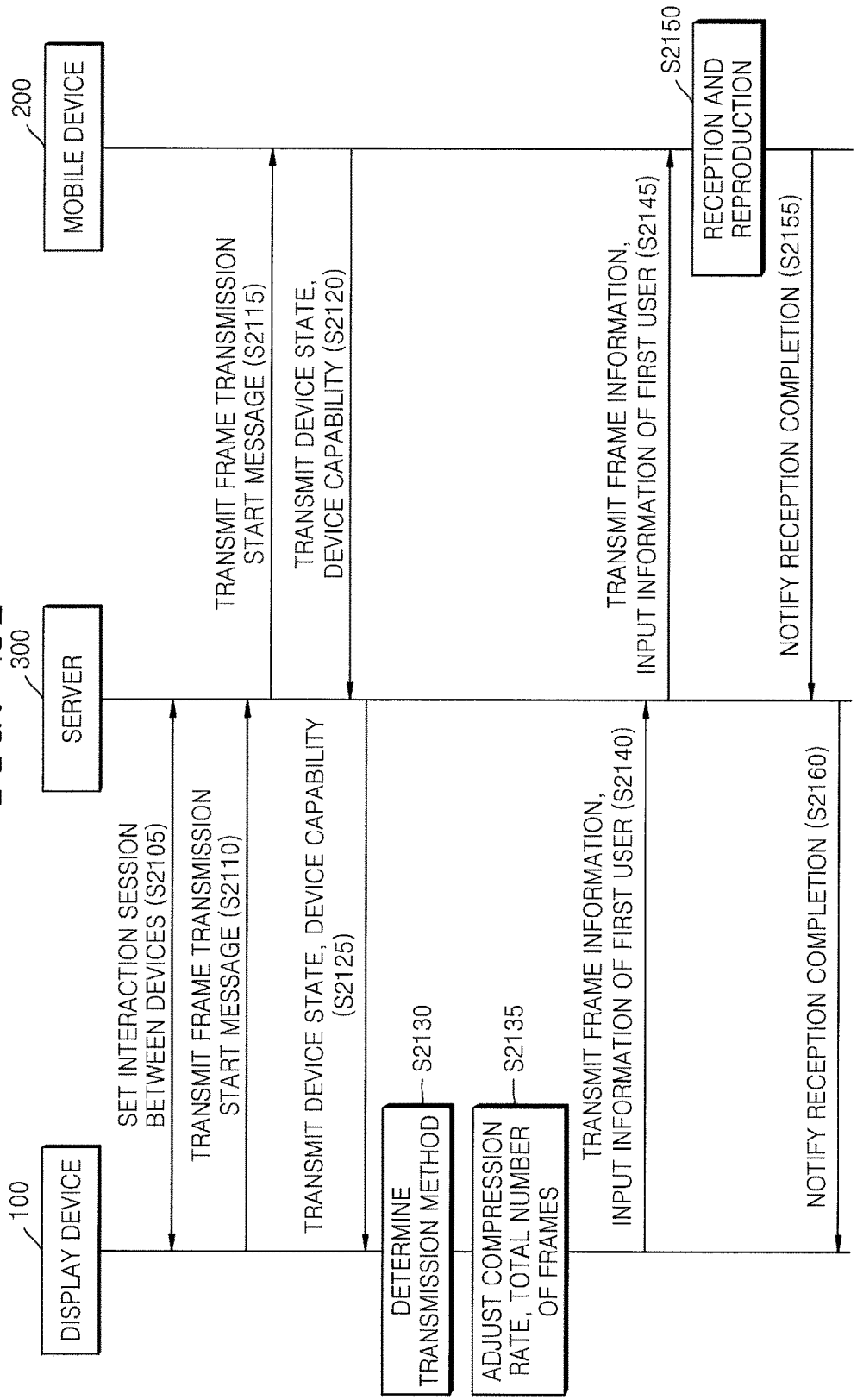

METHOD OF TRANSMITTING INQUIRY MESSAGE, DISPLAY DEVICE FOR THE METHOD, METHOD OF SHARING INFORMATION, AND MOBILE TERMINAL

CROSS-REFERENCE TO RELATED APPLICATIONS

This application claims the benefit of Korean Patent Application No. 10-2012-0081966, filed on Jul. 26, 2012, in the Korean Intellectual Property Office, the disclosure of which is incorporated herein in its entirety by reference.

BACKGROUND

1. Field

The present invention relates to a method in which a display device transmits an inquiry message, and a method in which a mobile terminal shares information, so as to share information between external devices.

2. Description of the Related Art

A smart television (smart TV) is a multifunctional TV having an internet access function, so that a user may install various applications in the smart TV and then may use various functions such as web surfing, video-on-demand (VOD) viewing, a social network service (SNS), a game, or the like.

The most particular feature of the smart TV is that the user and the smart TV may exchange information. This feature is the biggest difference from conventional TVs that only deliver information one-way. Due to this feature, the smart TV is also called an "interactive TV".

However, it may actually be inconvenient for the user to use various functions of the smart TV. In particular, with respect to content that is reproduced in the smart TV, when the user needs to share information in real-time with another user on the outside, it is difficult to interact with another external device by using the smart TV.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more embodiments relate to a method of sharing information with an external device when a user input is detected during reproduction of content, wherein the information may include input information about the detected user input and related information corresponding to at least one frame that is selected based on a point of time at which the user input is detected.

The foregoing described problems may be overcome and/or other aspects may be achieved by one or more embodiments of a method of transmitting an inquiry message, which may be performed by a display device, where the method may include operations of reproducing content in the display device; receiving an input from a user, wherein the input from the user may be related to the content; generating an inquiry message about the content, based on the input from the user; extracting information, which may be related to the input from the user, from the content; and transmitting the extracted information and the inquiry message to an external device that may be connected with the display device.

The extracted information may include at least one of information about a frame of the content that is reproduced when the input from the user is received and additional information about the frame.

The operation of receiving the input further may include an operation of analyzing the input from the user and then determining whether the input from the user is related to the content.

The operation of determining may include operations of extracting at least one meaning unit by parsing the input from the user; and determining a relation between the at least one meaning unit and the content, based on metadata of the content.

The operation of determining the relation may include operations of obtaining a meaning unit related to the content from the metadata of the content, for example, by using ontology; and comparing the meaning unit related to the content with the at least one meaning unit.

The operation of receiving the input from the user may further include an operation of determining whether the input from the user corresponds to a predetermined sentence structure.

The operation of receiving the input from the user may include an operation of receiving, for example, at least one of a touch input, a voice input, a key input, a motion input, and a bending input of the user, etc.

The operation of receiving the input from the user may include an operation of obtaining, for example, at least one of a text message, a voice message, and an image, etc., that occur in response to the input from the user.

The operation of extracting may include an operation of extracting at least one frame from the content and additional information about the at least one frame, based on at least one of an input occurrence time of the user, an input elapsed-time of the user, and an input end time of the user.

The operation of extracting may include an operation of extracting a frame corresponding to a point of time at which a reproduction screen of the content is changed during an input elapsed-time of the user.

The additional information about the frame may include, for example, at least one of reproduction position information of the frame, sequence information of the frame, and object information about an object that is included in the frame, etc.

The operation of transmitting may further include an operation of adjusting at least one of a compression rate of a frame, resolution of a frame, and a total number of frames to be transmitted.

The method may further include an operation of receiving input information of a user of the external device from the external device.

The method may further include an operation of displaying the inquiry message and the input information of the user of the external device on a share window for sharing information with the external device.

The share window may include, for example, at least one of a shared memo pad, a shared white board, and a message window, etc.

The method may further include an operation of displaying and overlaying the share window on an area that displays the content.

The method may further include an operation of displaying the share window on a screen of another device that is connected with the display device.

The content may include, for example, at least one of broadcasting content, education content, music content, movie content, picture content, and electronic book content, etc.

The operation of transmitting may include an operation of transmitting the inquiry message by using, for example, at least one of a voice call signal, a videotelephony signal, and a message transmission signal, etc.

The method may further include operations of receiving a connection request from the external device; and authenticating a connection with the external device, in response to the connection request.

The operation of authenticating may include an operation of authenticating the connection with the external device, based on, for example, at least one of identification (ID) information of the external device, ID information of a user of the external device, and one-time use authentication information, etc.

The method may further include operations of transmitting a connection request to the external device; and receiving a connection acceptance message from the external device, in response to the connection request.

The foregoing described problems may be overcome and/or other aspects may be achieved by one or more embodiments of a method of sharing, by a mobile device, information with an external display device, where the method may include operations of receiving input information of a first user and related information from the external display device, wherein the input information of the first user may be obtained while content is reproduced in the external display device, and the related information may correspond to at least one frame of the content that is reproduced in the external display device; displaying the input information of the first user and the at least one frame; obtaining input information of a second user that may correspond to the input information of the first user; and transmitting the input information of the second user to the external display device.

The related information that may correspond to the at least one frame may include a frame that may be selected based on a point of time at which the input information of the first user is received, reproduction position information of the selected frame, sequence information of the selected frame, or object information about an object that may be included in the selected frame.

The method may further include an operation of reproducing and displaying content on a screen of the mobile device, wherein the content may match the content that may be reproduced in the external display device.

The method may further include an operation of displaying the input information of the first user and the input information of the second user on a share window for sharing information with the external display device.

The method may further include an operation of displaying and overlaying the input information of the first user and the input information of the second user on an area that displays the content.

The method may further include an operation of displaying the share window that may include the input information of the first user and the input information of the second user on a screen of a device, other than the external display device, that may be connected with the mobile device.

The method may further include operations of transmitting a connection request to the external display device; and receiving a connection acceptance message from the external display device, in response to the connection request.

The method may further include operations of requesting authentication with respect to remote control of the external display device from the external display device; and receiving a remote control acceptance message from the external display device, in response to the requesting.

The method may further include an operation of controlling at least one of a change of a reproduction position of the content that is reproduced in the external display device, a reproduction stop, an adjustment of reproduction speed, a volume adjustment, and a change of reproduction-target content.

The foregoing described problems may be overcome and/or other aspects may be achieved by one or more embodiments of a display for reproducing and displaying content on a screen of the display device; a user input for receiving an input from a user wherein the input from the user is related to the content, and generating an inquiry message about the content, based on the input from the user; an extractor for extracting information, which is related to the input from the user, from the content; a communicator for transmitting the extracted information and the inquiry message to an external device that is connected with the display device; and a controller for controlling the display, the user input, the extractor, and the communicator.

The extractor may extract at least one of information about a frame of the content that is reproduced when the input from the user is received and additional information about the frame.

The controller may analyze the input from the user and then may determine whether the input from the user is related to the content.

The controller may extract at least one meaning unit by parsing the input from the user, and may determine a relation between the at least one meaning unit and the content, based on metadata of the content.

The controller may obtain a meaning unit related to the content from the metadata of the content, by using ontology, and may compare the meaning unit related to the content with the at least one meaning unit.

The controller may determine whether the input from the user corresponds to a predetermined sentence structure.

The user input may receive at least one of a touch input, a voice input, a key input, a motion input, and a bending input of the user.

The extractor may extract at least one frame from the content and additional information about the at least one frame, based on at least one of an input occurrence time of the user, an input elapsed-time of the user, and an input end time of the user.

The extractor may extract a frame corresponding to a point of time at which a reproduction screen of the content is changed during an input elapsed-time of the user.

The controller may adjust at least one of a compression rate of a frame, resolution of a frame, and a total number of frames to be transmitted.

The communicator may receive input information of a user of the external device from the external device.

The display may display the inquiry message and an input from the user of the external device on a share window for sharing information with the external device.

The display may display and overlay the share window on an area that displays the content.

The display may display the share window on a screen of another device that is connected with the display device.

The communicator may transmit the inquiry message by using at least one of a voice call signal, a videotelephony signal, and a message transmission signal.

The communicator may receive a connection request from the external device, and the controller may authenticate a connection with the external device, in response to the connection request.

The controller may authenticate the connection with the external device, based on at least one of identification (ID) information of the external device, ID information of a user of the external device, and one-time use authentication information.

The communicator may transmit a connection request to the external device, and may receive a connection acceptance message from the external device, in response to the connection request.

The foregoing described problems may be overcome and/or other aspects may be achieved by one or more embodiments of a mobile device for sharing information with an external display device, where the mobile device may include a communicator for receiving input information of a first user and related information from the external display device, wherein the input information of the first user may be obtained while content is reproduced in the external display device, and the related information may correspond to at least one frame of the content that may be reproduced in the external display device, and for transmitting input information of a second user that may correspond to the input information of the first user to the external display device; a display for displaying the input information of the first user and the at least one frame; a user input for obtaining the input information of the second user that may correspond to the input information of the first user; and a controller for controlling the communicator, the display, and the user input.

The display may reproduce and display content on a screen of the mobile device, wherein the content may match the content that is reproduced in the external display device.

The display may display the input information of the first user and the input information of the second user on a share window for sharing information with the external display device.

The display may display and overlay the input information of the first user and the input information of the second user on an area that displays the content.

The display may display the share window including the input information of the first user and the input information of the second user on a screen of a device, other than the external display device, that is connected with the mobile device.

The communicator may transmit a connection request to the external display device, and may receive a connection acceptance message from the external display device, in response to the connection request.

The communicator may request authentication with respect to remote control from the external display device, and may receive a remote control acceptance message from the external display device, in response to the requesting.

The controller may control at least one of a change of a reproduction position of the content that is reproduced in the external display device, a reproduction stop, an adjustment of reproduction speed, a volume adjustment, and a change of reproduction-target content.

BRIEF DESCRIPTION OF THE DRAWINGS

These and/or other aspects will become apparent and more readily appreciated from the following description of embodiments, taken in conjunction with the accompanying drawings of which:

FIG. 21 is a flowchart of a method of sharing information via a server, according to one or more embodiments;

DETAILED DESCRIPTION

Figure 1:
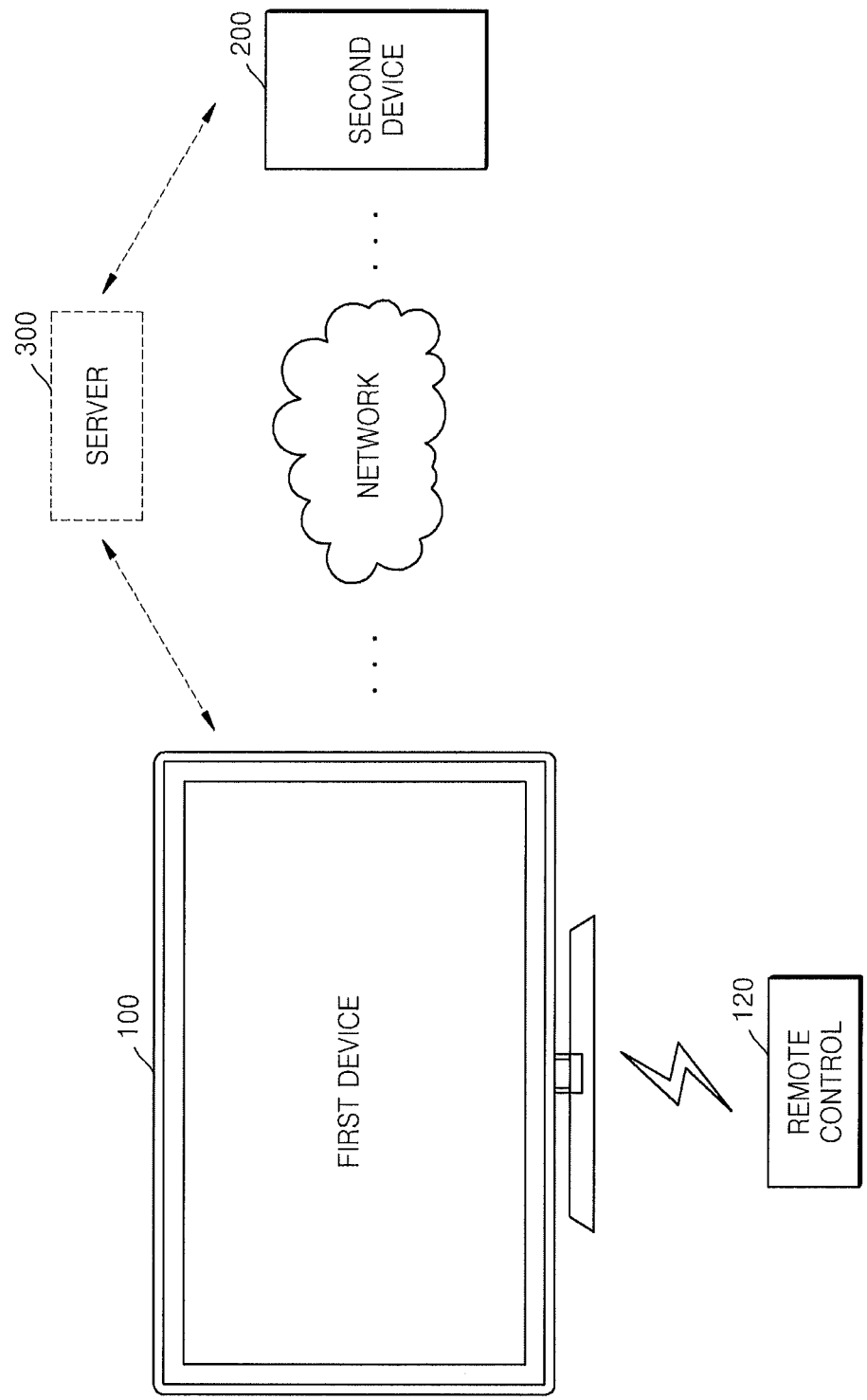
FIG. 1 is a diagram illustrating an information sharing system according to one or more embodiments.

Hereinafter, terms that are used in the present invention will be briefly described, and then the present invention will be described in detail.

All terms including descriptive or technical terms that are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" refer to a unit for processing at least one function or operation, wherein the unit and the block may be embodied as hardware or software or embodied by combining hardware and software.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an information sharing system according to one or more embodiments. As illustrated in FIG. 1, the information sharing system may include a first device 100, a second device 200, and a server 300. However, not all shown elements are necessary elements. That is, the information sharing system may be embodied with more or less elements than the shown elements. For example, the information sharing system may be formed of the first device 100 and the second device 200 or may be formed of the first device 100, the second device 200, and the server 300.

The first device 100 collectively refers to various types of a display device including a display panel. For example, the display device in one or more embodiments one or more embodiments may include, but is not limited thereto, a smart television (smart TV), an Internet Protocol TV (IPTV), a digital TV (DTV), a computer, a notebook computer, an electronic book terminal, a tablet personal computer (PC), a terminal for digital broadcasting, a personal digital assistant (PDA), a portable multimedia player (PMP), a navigation device, and consumer electronic (CE) devices (e.g., a refrigerator, an air conditioner, or the like that have a display panel).

The first device 100 may reproduce various types of content. For example, the display device 100 may reproduce moving picture content (e.g., a TV program image, video-on-demand (VOD), a personal image such as User-Created Contents (UCC), a music video, a Youtube video, or the like), still image content (e.g., a photo, a picture, or the like), text content (e.g., an electronic book (poetry, novels, or the like), a letter, a work file, a web-page, or the like), music content (for example, music, radio broadcasting, or the like), an application (a widget, a game, videotelephony, or the like), and the like.

The first device 100 may communicate with the second device 200 or the server 300 via a network. In one or more embodiments, the network may be implemented by using wireless communication technology such as Wi-Fi, a home radio frequency (RF), Bluetooth, a High Rate-Wireless Personal Area Network (HR-WPAN), an ultra-wide band (UWB), a Low Rate-Wireless Personal Area Network (LR-WPAN), the Institute of Electrical and Electronics Engineers (IEEE) 1394 standard, or the like.

The first device 100 may share information with the second device 200 by transmitting information related to content that is reproduced, and information that is input by a user. Hereinafter, for convenience of description, the information that is input by the user is referred to as user input information or input information from the user.

The first device 100 may include a user input 120 capable of receiving an input from the user. In one or more embodiments, the user input 120 may be mounted in the first device 100 or may externally exist as a remote control apparatus. The remote control apparatus may be embodied as one of various forms. For example, the remote control apparatus may be a display device-dedicated remote controller, a smart phone, a mobile phone, a tablet PC, or the like.

The second device 200 may be a device capable of obtaining content from an external source, and displaying, reproducing, or storing the obtained content. The second device 200 may include a mobile phone, a smart phone, a laptop computer, a tablet PC, an electronic book terminal, a PDA, a PMP, a navigation device, a smart TV, CE devices (e.g., a refrigerator, an air conditioner, or the like that have a display panel), or the like.

The second device 200 may communicate with the first device 100 after authentication. For example, the second device 200 may form a videotelephony session, a voice call session, a message exchange session, or the like with the first device 100.

In one or more embodiments, the second device 200 may control reproduction/stopping of content, volume adjustment, a channel change, or the like of the first device 100 from a remote place.

In one or more embodiments, the server 300 may relay sharing of information between the first device 100 and the second device 200. Thus, the server 300 may communicate with the first device 100 and the second device 200 via a network.

For example, the server 300 may receive input information of a first user and related information corresponding to at least one frame from the first device 100, and may transmit the input information and the related information to the second device 200. Also, the server 300 may receive input information of a second user, which corresponds to the input information of the first user, from the second device 200, and may transmit the input information of the second user to the first device 100. The first user may be a user who directly controls the first device 100 within an adjacent distance from the first device 100, and the second user may be a user who directly controls the second device 200 within an adjacent distance from the second device 200. Also, the input information of the first user may include an inquiry of the first user, which is about content that is reproduced in the first device 100.

The server 300 may authenticate the first device 100 or the second device 200 so as to allow the first device 100 and the second device 200 to establish an interaction session.

Hereinafter, for convenience of description, it is assumed that the first device 100 is a display device. Also, it is assumed that the second device 200 is a mobile device. In other embodiments, the first device 100 may be described as an external display device, and the second device 200 may be described as an external device.

Figure 2:
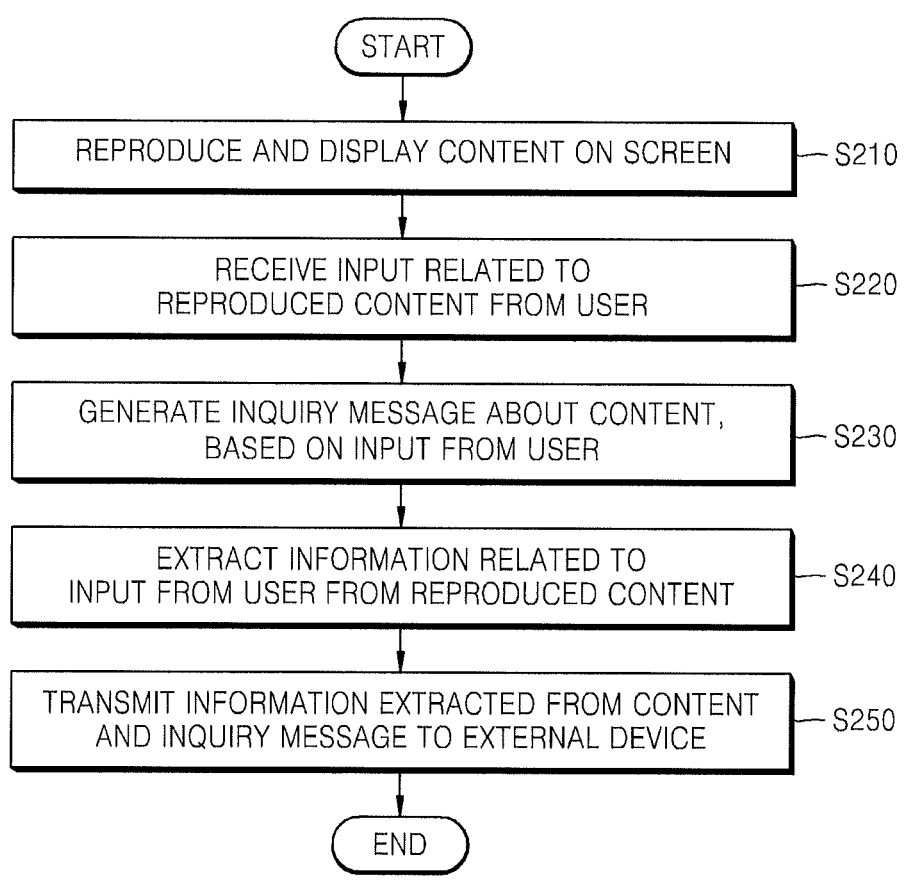
FIG. 2 is a flowchart of a method of transmitting an inquiry message, performed by a display device, according to one or more embodiments.

With reference to FIG. 2, a method of sharing, by the display device 100, information with the external device 200 will now be described in detail.

FIG. 2 is a flowchart of a method of transmitting an inquiry message, performed by the display device 100, according to one or more embodiments.

As illustrated in FIG. 2, the display device 100 may reproduce and display content on a screen (operation S210). In one or more embodiments, the content may include both a still image and a moving picture. For example, the content may include broadcasting content, education content, music content, movie content, picture content, electronic book content, or the like.

The display device 100 may display reproduced content on an entire area or a partial area of the screen.

While the display device 100 reproduces and displays the content on the screen, the display device 100 may receive an input related to the reproduced content from a first user (operation S220). Here, input information of the first user may be information that is input by a user of the display device 100 and that is about the reproduced content, and may be input information for interaction with the external device 200.

In one or more embodiments, the display device 100 may analyze the input information of the first user and thus may determine whether the input information of the first user is about the reproduced content. That is, according to one or more embodiments, the display device 100 may compare a relation between the input information of the first user and the content, by using ontology.

The ontology means formal and explicit specification about shared conceptualization. The ontology may be regarded as a type of a dictionary formed of words and relations, wherein the dictionary includes hierarchically expressed words that are related to a specific domain, and a reasoning rule that can additionally extend the words.

In more detail, the display device 100 may obtain a meaning unit related to the content from metadata of the content that is reproduced, by using the ontology. The metadata of the content may include a title of the content, a type of the content, a synopsis of the content, information about a representative object included in the content, or the like. Here, the meaning unit may be a unit of a smallest meaningful word such as a morpheme of a Korean language or a word of an English language.

When the input by the first user occurs, the display device 100 may parse the input information of the first user and thus may extract at least one meaning unit. Then, the display device 100 may compare the meaning unit related to the content that is obtained by using the ontology with the meaning unit extracted from the input information of the first user, and may determine a relation between the input information of the first user and the content.

For example, when a title of the content is "an animal world exploration for children", the display device 100 may obtain meaning units such as a kid, an infant, a child, children, an animal, a beast, a lion, an elephant, a tiger, a giraffe, a leopard, a world, the earth, exploration, a travel, or the like which are related to the content, by using the ontology. Here, when input information of "Mom, what is that animal?" is input by the first user, the display device 100 may analyze the input information from the first user and then may extract a meaning unit of "animal". Since the extracted meaning unit of "animal" is included in the meaning units related to the content that are obtained by using the ontology, the display device 100 may determine that the input information of the first user is related to the content.

In one or more embodiments, the display device 100 may parse the input information of the first user and thus may determine whether the input information of the first user corresponds to a predetermined sentence structure. For example, the display device 100 may determine whether the input information of the first user has a structure of an interrogative sentence, by detecting a type of a verb, existence of an auxiliary verb, existence of an interrogative, or the like that are included in the input information of the first user.

In one or more embodiments, the display device 100 may recognize at least one of a touch input, a voice input, a key input, a motion input, and a bending input by the first user that are related to the content that is reproduced. Thus, the first user may input a message about the reproduced content into the display device 100, by using various methods including the touch input, the voice input, the key input, the motion input, and the bending input.

For example, when the display device 100 includes a touch pad, the first user may input the message about the reproduced content by touching a screen of the display device 100, and when the display device 100 does not include the touch pad, the first user may perform the touch input via the remote control apparatus 120 enabled for the touch input.

Alternatively, the first user may input the message about the reproduced content via the motion input by moving or rotating the remote control apparatus 120 in a three-dimensional (3D) space. When the display device 100 includes a flexible display or the remote control apparatus 120 includes a flexible display, the first user may perform a bending operation that is preset in the display device 100 or the remote control apparatus 120, so that the first user may input the message about the reproduced content into the display device 100.

In one or more embodiments, the input information of the first user may include at least one of a text message, a voice message, and an image that occur in response to the input by the first user. When the display device 100 detects the input by the first user, the display device 100 may analyze the input, and thus may obtain information including the input message of the first user, an input occurrence time of the first user, an input elapsed-time of the first user, an input end time of the first user, an input occurrence position of the first user, or the like that are related to the reproduced content.

For example, when the first user inputs text by using a key or a button, the display device 100 may recognize a start time and an end time of the input of the text. Also, when the first user inputs text or a picture via a touch input, the display device 100 may recognize a touch start time and a touch end time, or may recognize a touch position (i.e., a touch place) on the screen. In one or more embodiments, the input occurrence position of the first user may be an absolute position or a relative position.

When the first user inputs a voice as the message about the reproduced content, the display device 100 may recognize a start time and an end time of voice occurrence. In one or more embodiments, the display device 100 may recognize an input of stop/pause/period repetition/fast reproduction/slow reproduction or the like that are about the reproduced content.

The display device 100 may obtain the input information of the first user, based on the input by the first user. The input information of the first user is information that is input by the first user so that the first user may interact with the external device 200. In one or more embodiments, the input information of the first user may include an inquiry about the reproduced content.

That is, the display device 100 may generate an inquiry message about the content, based on the input by the first user (operation S230).

The display device 100 may extract information related to the input by the first user from the reproduced content, based on a reception time of the input by the user (operation S240). The information that is extracted from the content may be a frame or additional information of the frame. The additional information of the frame may include reproduction position information of the frame, sequence information of the frame, object information about an object that is included in the frame, or the like.

That is, the display device 100 may extract at least one frame or additional information about the at least one frame of the reproduced content, based on a reception time of the input information of the first user.

The display device 100 may select at least one frame of the reproduced content, based on at least one of the input occurrence time of the first user, the input elapsed-time of the first user, and the input end time of the first user.

For example, the display device 100 may select a frame corresponding to the input occurrence time of the first user, or may select a frame corresponding to the input end time of the first user. That is, the display device 100 may select the frame that is displayed on the screen when the input by the first user occurs, or may select the frame that is displayed on the screen when the input by the first user is ended.

Alternatively, the display device 100 may select both of the frame corresponding to the input occurrence time of the first user and the frame corresponding to the input end time of the first user. In one or more embodiments, the display device 100 may select all frames between the input occurrence time of the first user through the input end time of the first user, or may select frames between the input occurrence time of the first user through the input end time of the first user, at a predetermined interval.

When the first user pauses on the content, the display device 100 may select a frame that corresponds to a paused time. For example, when the input by the first user occurs, the display device 100 may automatically pause reproduction of the content, and may select a frame that is displayed on the screen when the automatic pause occurs.

The display device 100 may select a frame that corresponds to a change of a reproduction screen of the content, while the input by the first user is maintained. That is, the display device 100 may select the frame that is changed during the input elapsed-time of the first user.

The display device 100 may transmit the information extracted from the content and the inquiry message to the external device 200 (operation S250).

The information that is extracted from the content may be related information that corresponds to a frame of the content that is reproduced in the display device 100 when the display device 100 receives the input from the first user. For example, the related information may include the frame, the reproduction position information of the frame, the sequence information of the frame, the object information about the object that is included in the frame, or the like.

That is, the display device 100 may transmit the selected frame to the external device 200, or the display device 100 may transmit the reproduction position information of the selected frame or the sequence information of the selected frame to the external device 200, instead of the selected frame.

In particular, when the external device 200 reproduces content that is the same as the content that is reproduced in the display device 100, although the display device 100 transmits only the reproduction position information (e.g., a timestamp) of the selected frame or the sequence information of the selected frame to the external device 200, the external device 200 may extract the selected frame. Thus, in order to reduce an amount of data to be transmitted, the display device 100 may transmit the reproduction position information or the sequence information of the selected frame to the external device 200, instead of the selected frame.

In one or more embodiments, the display device 100 may adjust at least one of a compression rate of the selected frame, resolution of the selected frame, and a total number of frames to be transmitted. For example, when resolution of the external device 200 is lower than resolution of the display device 100, the display device 100 may decrease resolution of the selected frame and may transmit it. Also, in order to reduce the amount of data to be transmitted, the display device 100 may increase the compression rate of the selected frame or may decrease the total number of frames to be transmitted.

When the selected frame includes only one frame, the display device 100 may transmit one image file to the external device 200, and when the selected frame includes two or more frames, the display device 100 may transmit a plurality of image files to the external device 200. When the selected frame includes two or more frames, the display device 100 may convert the selected two or more frames into animation gif files or into flash files and then may transmit them, or may transmit the selected two or more frames in the form of a moving picture format. In one or more embodiments, the display device 100 may extract an object (e.g., a representative object, a primary object, or the like) included in the selected frame, and may transmit object information about the extracted object to the external device 200.

Here, in one or more embodiments, the display device 100 may transmit the related information corresponding to the selected frame, and the input information (e.g., the inquiry message) of the first user to the external device 200. That is, the display device 100 may transmit the input message of the first user, information about the input occurrence position of the first user, or the like to the external device 200, so that to the display device 100 may share information (i.e., interaction information) with the external device 200.

The display device 100 may transmit the input information (e.g., the inquiry message) of the first user to the external device 200 via, for example, at least one of a voice call signal, a videotelephony signal, and a message transmission signal, etc. For example, when the voice call session is formed between the display device 100 and the external device 200, the display device 100 may transmit the input information of the first user via the voice call session.

In one or more embodiments, only when the input information of the first user is related to the reproduced content, may the display device 100 transmit the information corresponding to the selected frame and the input information (e.g., the inquiry message) of the first user to the external device 200. That is, as described above, only when a meaning unit that is extracted from the input information of the first user is included in the meaning units that are related to the content and that are obtained by using the ontology, may the display device 100 transmit the input information of the first user and the information corresponding to the selected frame to the external device 200.

When the input information of the first user has a length that is equal to or less than a predetermined length, the display device 100 may not transmit the input information of the first user and the information corresponding to the selected frame to the external device 200. For example, when a short sound such as "um . . . ", "uh", or a coughing sound is input, the display device 100 may determine the short sound as a meaningless input and thus may not transmit the input information of the first user and the information corresponding to the selected frame to the external device 200.

In one or more embodiments, the display device 100 may store tone information of the first user with respect to a text sentence, and only when a user input with the tone information is received, may the display device 100 extract a frame or addition information of the frame and may transmit the frame or the addition information of the frame to the external device 200.

In one or more embodiments, when the input information of the first user corresponds to a predetermined sentence structure, the display device 100 may transmit the input information of the first user and the information corresponding to the selected frame to the external device 200. For example, when the input information of the first user has a structure of an interrogative sentence, the display device 100 may transmit the input information of the first user and the information corresponding to the selected frame to the external device 200.

Thus, according to one or more embodiments, it may be possible to reduce an error in which the input information of the first user and the information corresponding to the selected frame are wrongfully transmitted to the external device 200 when the user does not want the transmission.

A method in which the display device 100 shares information with the external device 200 will now be described in detail with reference to FIGS. 3 through 5.

Figure 3:
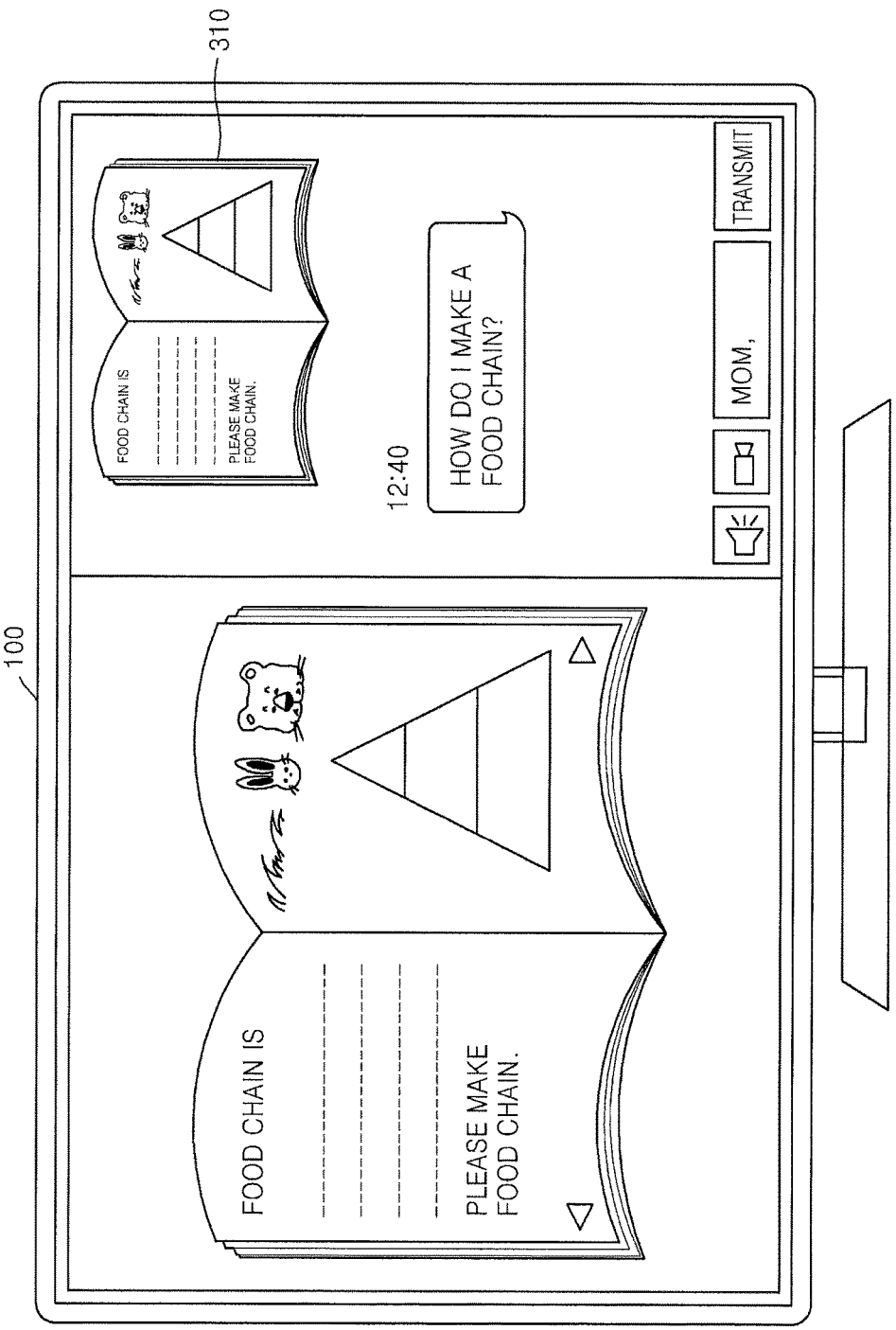
FIG. 3 illustrates a frame selection screen, according to one or more embodiments.

FIG. 3 illustrates a frame selection screen, according to one or more embodiments.

As illustrated in FIG. 3, the display device 100 may reproduce and display electronic book content. When a first user has an inquiry while the first user views the electronic book content displayed on the display device 100, the first user may input an inquiry message related to the electronic book content and may transmit the inquiry message to the external device 200. For example, the first user may input a message of "How do I make a food chain?" via a keyboard or may input the message of "How do I make a food chain?" by touching a virtual keyboard on a touch pad. Also, the first user may input the message of "How do I make a food chain?" by using his/her voice.

In this case, the display device 100 may recognize an input by the first user. Then, the display device 100 may obtain information of an input occurrence time (12 (hour): 40 (minute): 10 (second)) of the first user, an input end time (12 (hour): 40 (minute): 30 (second)) of the first user, an input occurrence position (X, Y=0.6, 0.4) of the first user, an input message ("How do I make a food chain?") of the first user, an input elapsed-time (20 seconds) of the first user, or the like.

In one or more embodiments, the display device 100 may select a frame 310 of the electronic book content that is displayed on a screen of the display device 100 at the input occurrence time (12 (hour): 40 (minute): 10 (second)) of the first user. In this case, the display device 100 may transmit the frame 310 that is displayed on the screen at the input occurrence time (12 (hour): 40 (minute): 10 (second)) of the first user, and the input message ("How do I make a food chain?") of the first user to the external device 200, so that the display device 100 may share the information with the external device 200.

Figure 4:
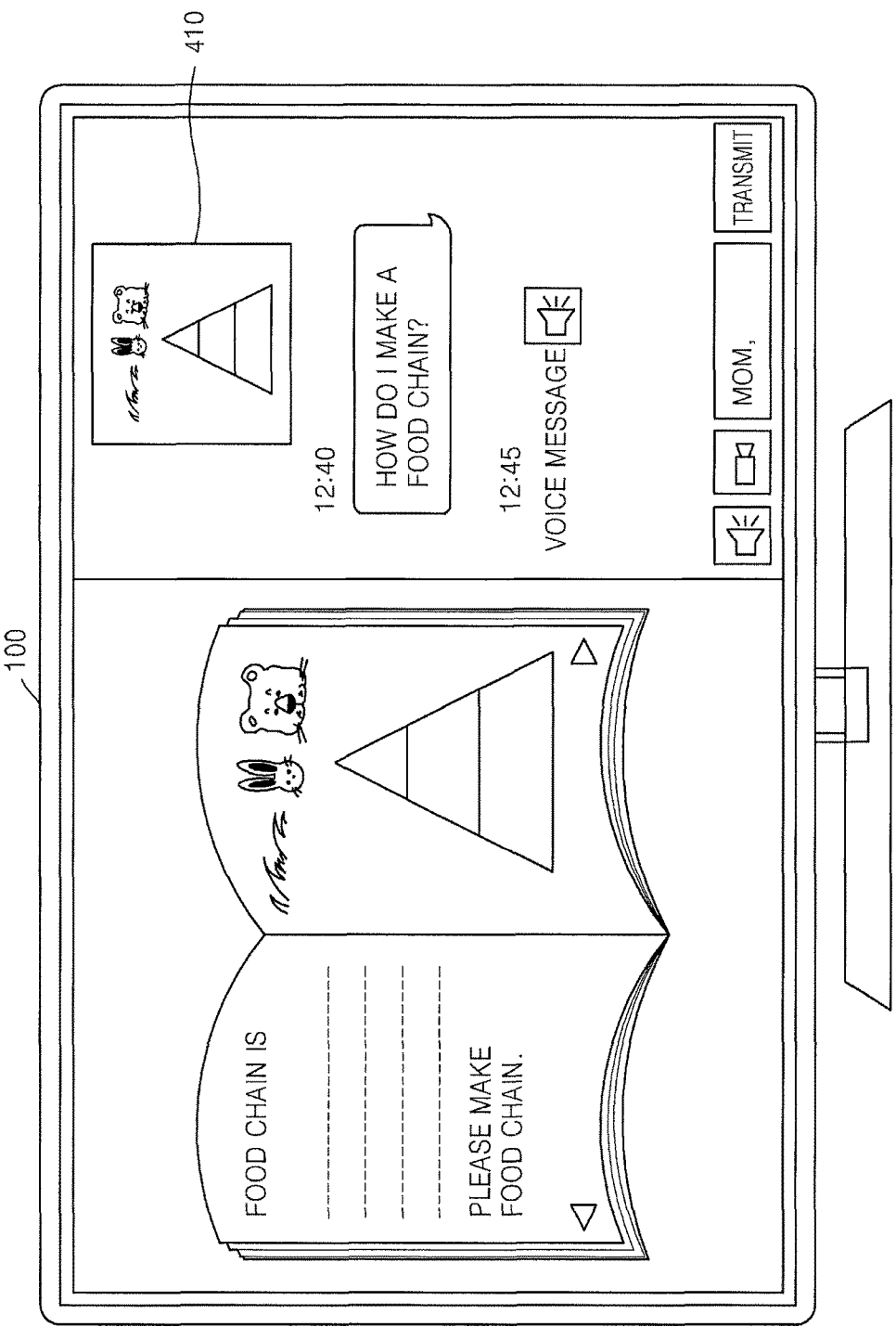
FIG. 4 illustrates a screen on which related information that corresponds to a frame is shared, according to one or more embodiments.

FIG. 4 illustrates a screen on which related information that corresponds to a frame is shared, according to one or more embodiments.

As illustrated in FIG. 4, the display device 100 may select a frame 310 of electronic book content that is displayed on a screen of the display device 100 at an input occurrence time (12 (hour): 40 (minute): 10 (second)) of a first user. The display device 100 may extract a picture at a right side, which is a representative object 410 of the frame 310, and may transmit information about the representative object 410 to the external device 200 that is a mobile device.

In one or more embodiments, the display device 100 may parse input information of the first user and then may extract a specific object that is included in a selected frame. For example, when the first user inputs a message of "How do I make a food chain" into the display device 100, the display device 100 may parse the message of the first user and then may extract only an object that corresponds to a food chain.

In one or more embodiments, when the first user inputs a message about reproduced content by using his/her voice, the display device 100 may change the voice input into text and may transmit the text to the external device 200, or may transmit the voice input in the form of a voice message to the external device 200.

Figure 5:
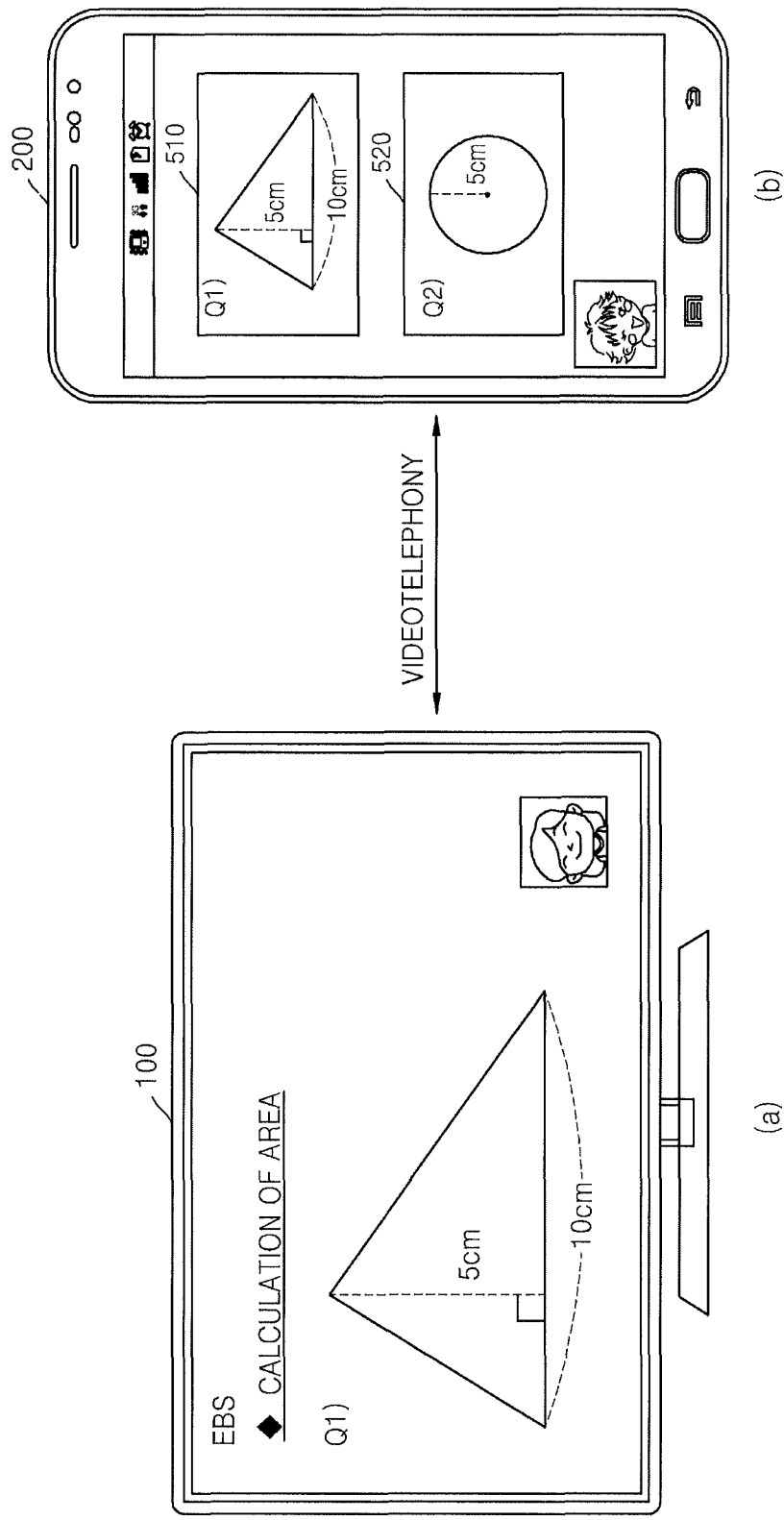
FIG. 5 illustrates a screen of an example in which information is shared during videotelephony, according to one or more embodiments.

FIG. 5 illustrates a screen of an example in which information is shared during videotelephony, according to one or more embodiments.

As illustrated in FIG. 5(a), when a first user and a second user of the external device 200 are in videotelephony, the display device 100 may transmit input information of the first user to the external device 200 via a videotelephony signal. Here, the display device 100 may select a frame that corresponds to a start time of voice occurrence of the first user, and may transmit the selected frame to the external device 200 via a signal (not shown) that is different from the videotelephony signal. That is, the display device 100 may recognize a voice of the first user in the videotelephony, and may transmit a frame of content, which is reproduced when the voice is recognized, to the external device 200.

As illustrated in FIG. 5(b), since the input information of the first user is transmitted via the videotelephony signal, the external device 200 may display only two pieces of related information 510 and 520 that correspond to the selected frame.

Hereinafter, with reference to FIG. 6, a method of sharing, by the display device 100, information with the external device 200 will now be described in more detail.

Figure 6:
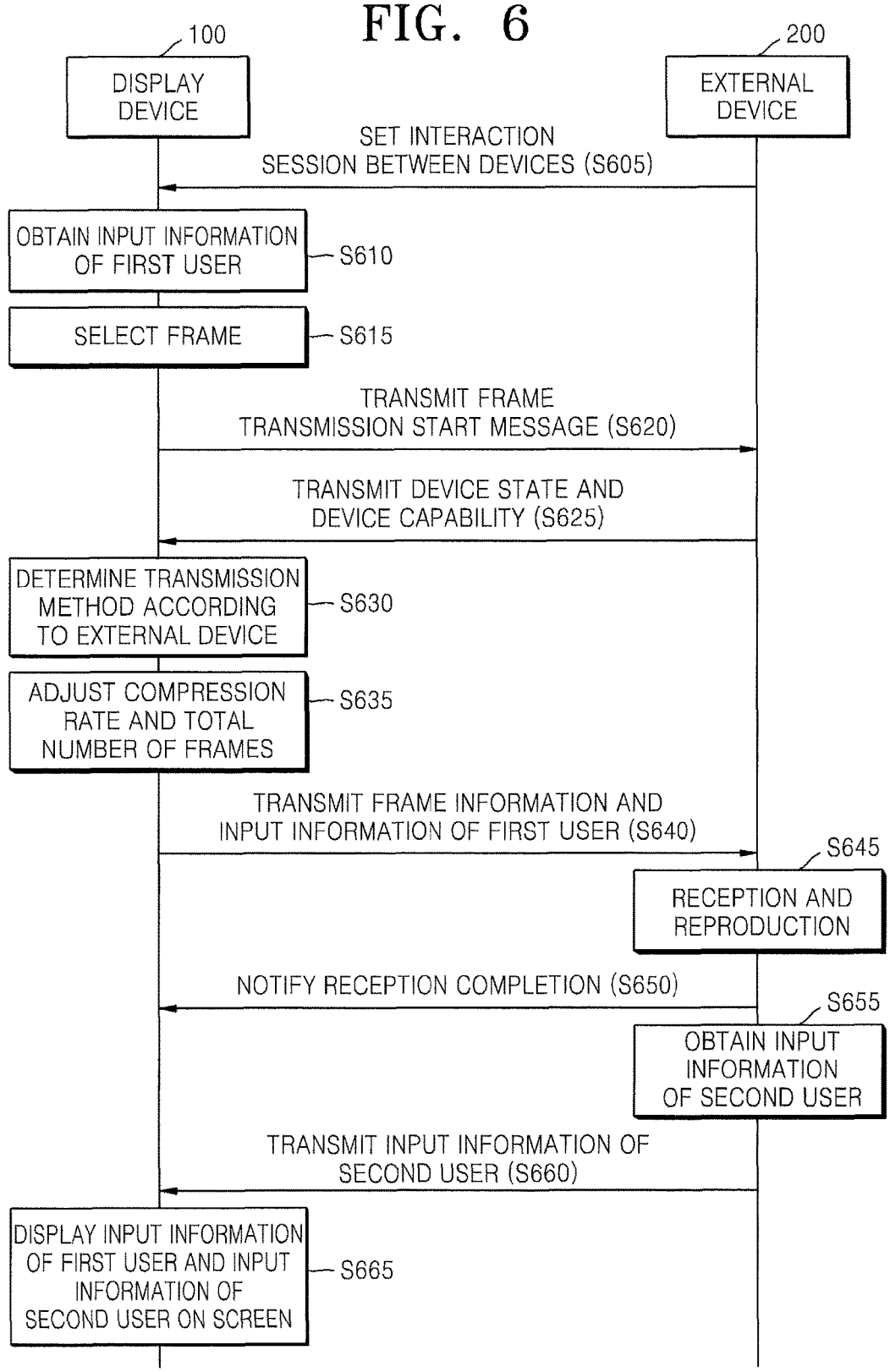
FIG. 6 is a flowchart of a method of sharing information, performed by the display device, according to one or more embodiments.

FIG. 6 is a flowchart of a method of sharing information, performed by the display device 100, according to one or more embodiments.

In operation S605, the display device 100 may set an interaction session with the external device 200. The interaction session may be a session that allows the display device 100 and the external device 200 to share information. For example, the interaction session may include a videotelephony session, a voice call session, a chatting session, a shared white board session, a shared memo pad session, or the like.

In one or more embodiments, the display device 100 may receive a connection request from the external device 200. Here, the display device 100 may authenticate connection with the external device 200, in response to the connection request from the external device 200. The display device 100 may authenticate the connection with the external device 200 by using various methods.

In one or more embodiments, the display device 100 may authenticate the connection with the external device 200 by using at least one of identification (ID) information of the external device 200, ID information of a second user, and one-time use authentication information. This will be described with reference to FIGS. 7 and 8.

Figure 7:
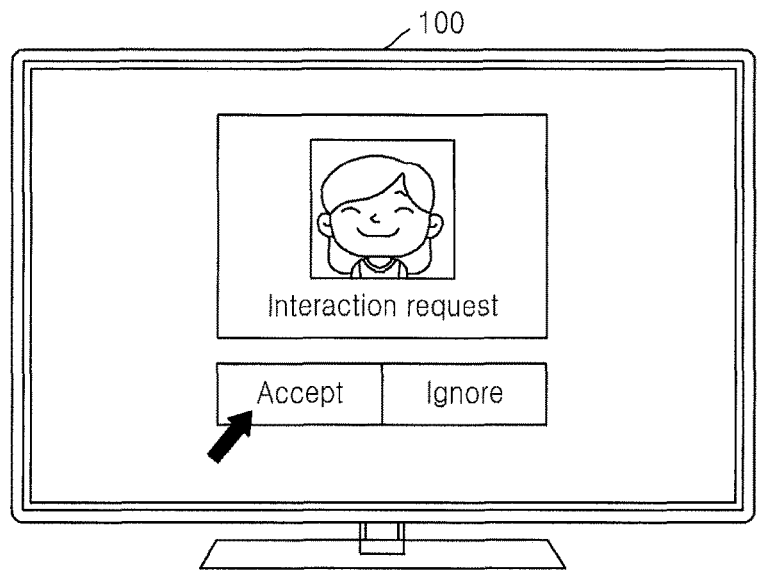
FIG. 7 illustrates an authentication screen, according to one or more embodiments.

FIG. 7 illustrates an authentication screen, according to one or more embodiments.

As illustrated in FIG. 7, when the external device 200 requests connection to the display device 100, the display device 100 may receive ID information of a second user (e.g., an image, an ID, a contact detail, or the like of the second user) from the external device 200 and may display the ID information on its screen.

The external device 200 may request the connection in a manner in which the external device 200 captures an image of a face of the second user by using a camera and then transmits the face image of the second user to the display device 100. Here, the face image of the second user may be a still image or a moving picture image that is transmitted in real-time.

In one or more embodiments, the connection request may include a videotelephony connection request, a voice call connection request, a chat request, or the like.

The first user may check the connection request from the second user, which is displayed on the screen of the display device 100, and then may accept or reject the connection request from the second user. When the first user accepts the connection request from the second user, the display device 100 may transmit an acceptance message with respect to the connection request to the second device 200, and then the display device 100 and the second device 200 may establish an interaction session.

Figure 8:
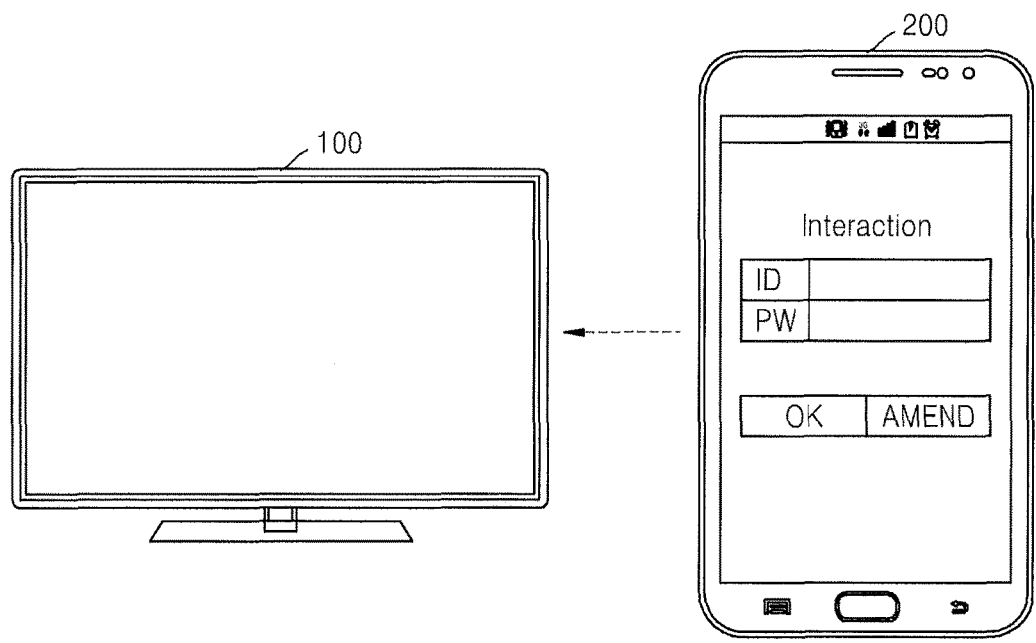
FIG. 8 illustrates an authentication screen, according to one or more embodiments.

FIG. 8 illustrates an authentication screen, according to one or more embodiments of the present invention.

As illustrated in FIG. 8, the display device 100 may authenticate a connection request from the external device 200, based on an ID and a password that are input by a second user. That is, when information about the ID and the password of the second user is stored in the display device 100, the display device 100 may compare the ID and the password of the second user, which are received from the second device 200, with the ID and the password of the second user that are previously stored in a memory of the display device 100, so that the display device 100 may authenticate connection with the external device 200.

In one or more embodiments, the display device 100 may authenticate a connection with the external device 200 by using one-time use authentication information that is generated by the display device 100. That is, when the display device 100 generates and transmits the one-time use authentication information to the external device 200, the second user may check the one-time use authentication information and may input the one-time use authentication information into the external device 200. Here, the external device 200 may transmit the one-time use authentication information that is input by the second user, to the display device 100, and then the display device 100 may compare the previously-generated one-time use authentication information with the one-time use authentication information that is received from the external device 200, so that the display device 100 may authenticate the connection with the external device 200. An example of the one-time use authentication information may include a one-time password (OTP).

In one or more embodiments, the display device 100 may authenticate connection with the external device 200, based on ID information of the external device 200. The ID information of the external device 200 may include a device ID, a device name, a MAC address, a device serial number, or the like. That is, when the display device 100 stores the ID information of the external device 200, the display device 100 may compare the ID information of the external device 200, which is received from the external device 200, with the ID information of the external device 200 that is previously stored in the memory of the display device 100, so that the display device 100 may authenticate the connection with the external device 200.

However, the display device 100 may first request connection to the external device 200. In this case, the display device 100 may receive a connection acceptance message from the external device 200 in response to its connection request.

In one or more embodiments, the display device 100 may receive an output of a predetermined application for sharing of information from the external device 200. In this case, the display device 100 may map the output of the predetermined application with a virtual broadcasting channel. Since the first user sets a channel of the display device 100 as the virtual broadcasting channel, the first user may perform interaction with the second user of the external device 200.

Referring back to FIG. 6, in operation S610, the display device 100 may obtain input information of the first user. In operation S615, the display device 100 may select at least one frame included in reproduced content, based on the input information of the first user. Operations S610 and S615 of the flowchart of FIG. 6 correspond to operations S220 and S230 of the flowchart of FIG. 2, thus, detailed descriptions thereof are omitted here.

In operation S620, the display device 100 may transmit a frame transmission start message to the external device 200. Here, in operation S625, the display device 100 may receive external device information (for example, about a device state and a device capability) from the external device 200. The external device information may include network information (e.g., information about a bandwidth and an available communication method) of the external device 200, resolution of the external device 200, or the like.

In operation S630, the display device 100 may determine a transmission method, based on the network information of the external device 200. The transmission method may include a wired communication method, a wireless communication method (a wireless local area network (LAN) and near-field communication (NFC)), a mobile communication method (2G/3G/4G/Wibro), or the like.

In operation S635, the display device 100 may adjust a compression rate of the selected frame, and a total number of frames to be transmitted. Also, the display device 100 may adjust resolution of the selected frame, in consideration of resolution of the external device 200. That is, according to one or more embodiments, the display device 100 may reduce an amount of data to be transmitted, by increasing the compression rate of the selected frame, by decreasing the total number of frames to be transmitted, or by decreasing the resolution of the selected frame.

In operation S640, the display device 100 may transmit related information corresponding to the selected frame, and the input information of the first user to the external device 200. In this case, in operation S645, the second device 200 may receive and display the input information of the first user on its screen. Also, the external device 200 may display the selected frame that is on the screen of the display device 100, based on the related information corresponding to the selected frame. That is, according to one or more embodiments, the external device 200 may reproduce content that is being reproduced by the display device 100, and may display the content that is on the screen of the display device 100.

In operation S650, the display device 100 may receive a reception completion notification message from the external device 200.

In operation S655, the external device 200 may receive input information of the second user that corresponds to the input information of the first user. The input information of the second user may include a response message of the second user in response to the input message of the first user, and may be information that is input by the second user so that the second user may interact with the first user of the display device 100. This will be described in detail with reference to FIG. 13.

In operation S660, the display device 100 may receive the input information of the second user. Here, the display device 100 may receive the input information of the second user via a wired or wireless communication network or a mobile communication network.

In operation S665, the display device 100 may display the input information of the first user and the input information of the second user on the screen. In one or more embodiments, the display device 100 may display the input information of the first user and the input information of the second user on a share window for sharing information with the external device 200.

In one or more embodiments, the share window may include, but is not limited to, a shared memo-pad, a shared white board, a message window, or the like. The share window may be displayed in various manners on the screen of the display device 100, and will be described in detail with reference to FIGS. 9 through 12. In other embodiments, an order of operations S605 through S665 may be changed or some of operations S605 through S665 may be skipped.

Figure 9:
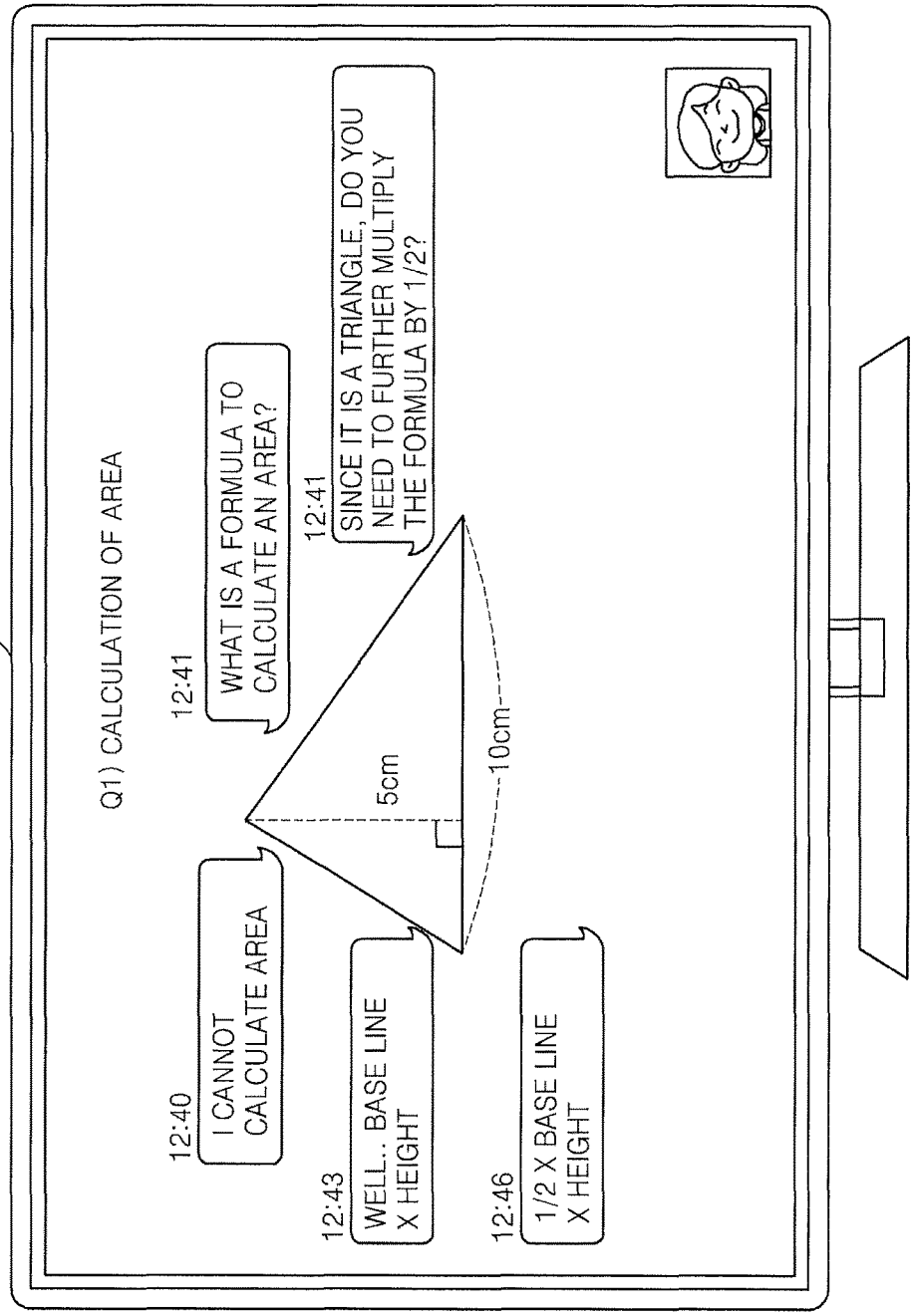
FIG. 9 illustrates an example in which the display device displays and overlays input information of a user on a content reproduction screen, according to one or more embodiments.

FIG. 9 illustrates an example in which the display device 100 displays and overlays input information of a user on a content reproduction screen, according to one or more embodiments.

As illustrated in FIG. 9, in one or more embodiments, the display device 100 may reproduce and display education content on its screen. Here, when a first user who views the education content inputs a message of "I cannot calculate an area." at 12:40 p.m., the display device 100 may display and overlay the input message of the first user on the content reproduction screen.

Also, when an input message of "What is a formula to calculate an area?" by a second user is received from the external device 200, the display device 100 may also display and overlay the input message of the second user on the content reproduction screen. That is, the display device 100 may display and overlay the input message of the first user and the input message of the second user on the content reproduction screen in a sequential order according to their occurrences.

Figure 10:
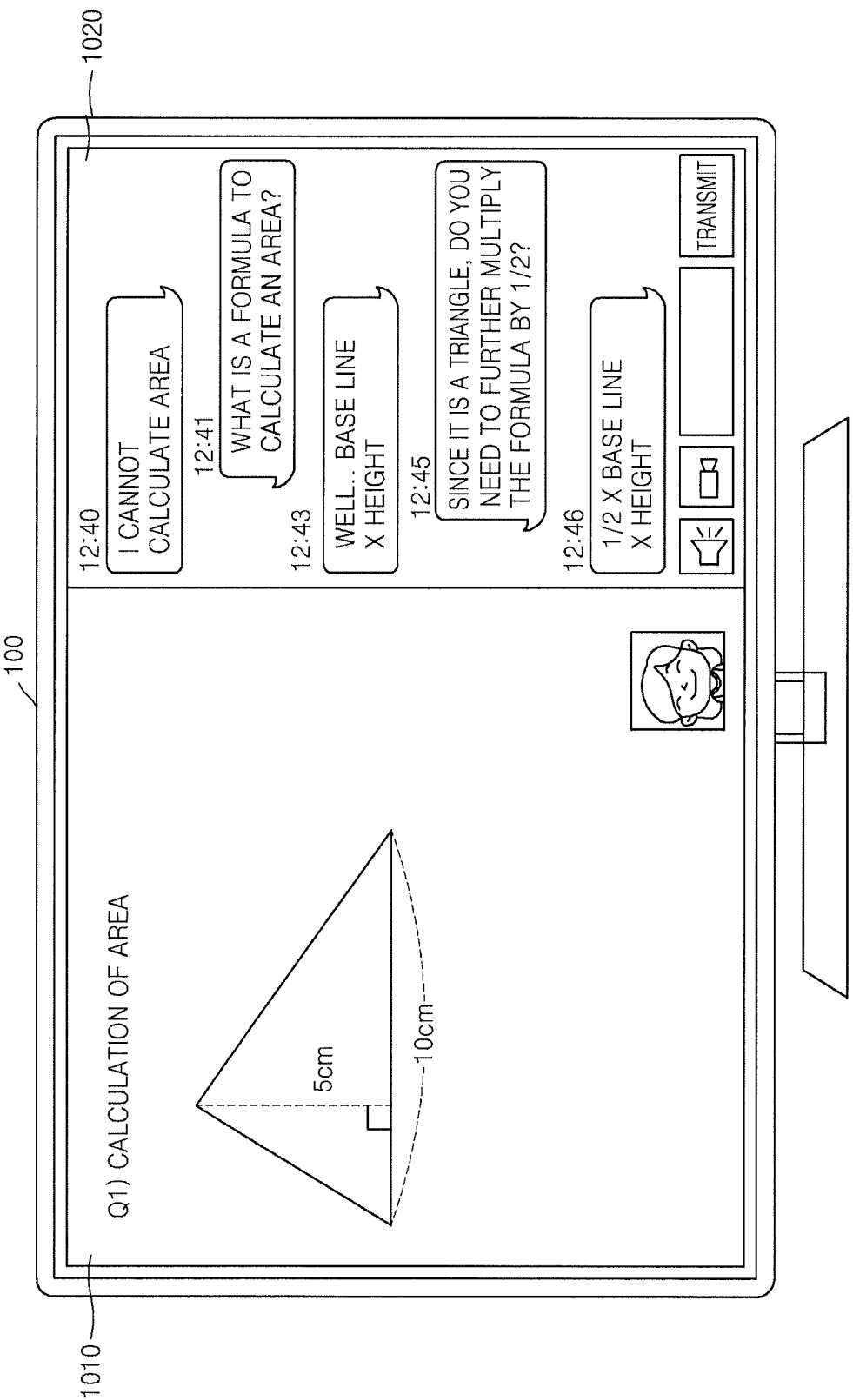
FIG. 10 illustrates an example in which input information of a user is displayed on a share window, according to one or more embodiments.

FIG. 10 illustrates an example in which input information of a user is displayed on a share window, according to one or more embodiments.

As illustrated in FIG. 10, the display device 100 may reproduce and display education content on a first area 1010 of a screen, and may display a share window including input information of a first user and input information of a second user on a second area 1020 of the screen. That is, the display device 100 may be divided into an area for displaying content and an area for displaying the input information of the first user and the input information of the second user.

Figure 11:
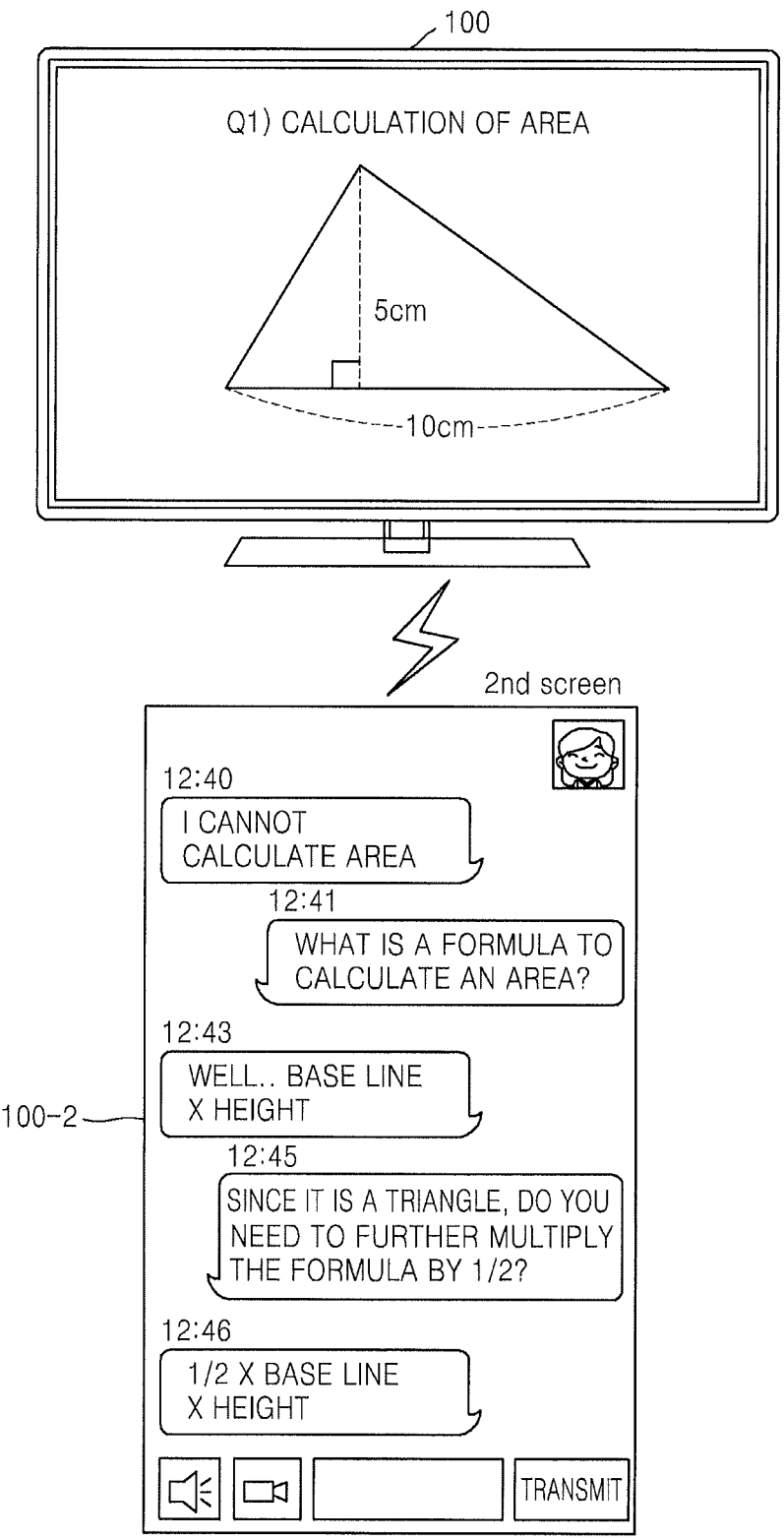
FIG. 11 illustrates an example in which input information of a user is displayed on a screen (i.e., a second screen) of another device that is connected with the display device, according to one or more embodiments.

FIG. 11 illustrates an example in which input information of a user is displayed on a screen (i.e., a second screen) of another device that is connected with the display device 100, according to one or more embodiments.

As illustrated in FIG. 11, in one or more embodiments, the display device 100 may reproduce and display only content on a screen of the display device 100, and another device 100-2 that is connected with the display device 100 may display a share window including input information of a first user and input information of a second user.

The other device 100-2 that is connected with the display device 100 may be the remote control apparatus 120 that controls the display device 100. For example, it is assumed that the first user controls the display device 100 by using a tablet PC as the remote control apparatus 120. Here, when the display device 100 obtains the input information of the first user and the input information of the second user, the display device 100 may display the share window including the input information of the first user and the input information of the second user on the tablet PC. That is, the first user may control the display device 100 by using the tablet PC, and may check the input information of the first user and the input information of the second user by using the tablet PC.

Figure 12:
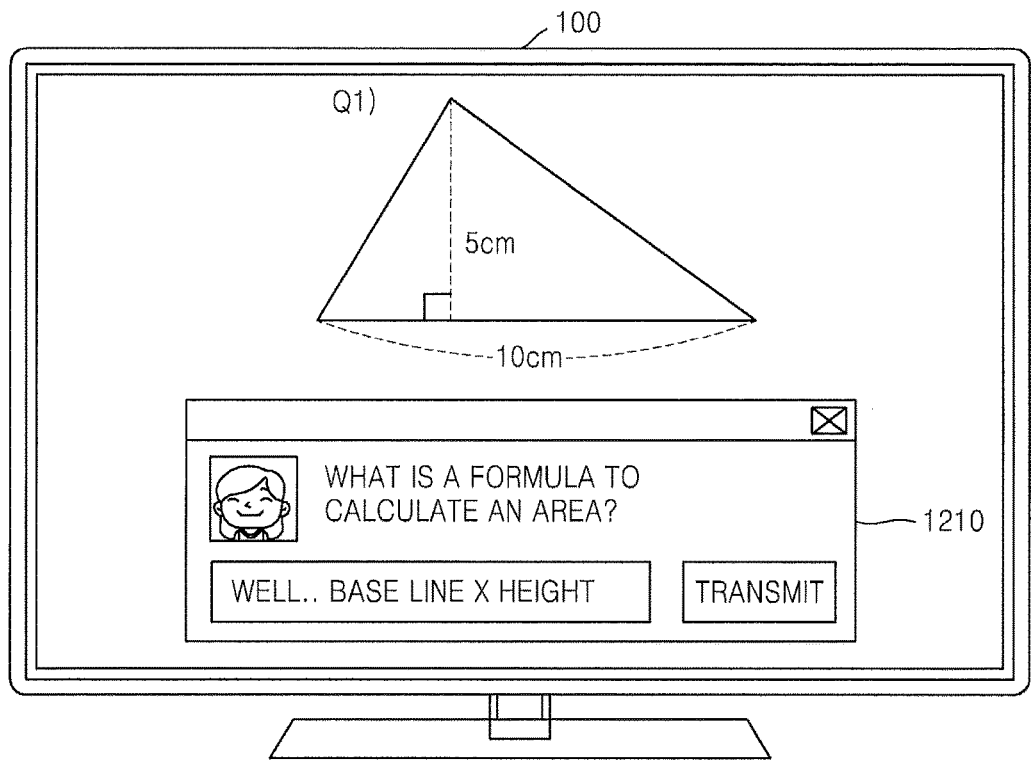
FIG. 12 illustrates a screen on which a pop-up window including input information of a user is displayed, according to one or more embodiments.

FIG. 12 illustrates a screen on which a pop-up window 1210 including input information of a user is displayed, according to one or more embodiments.

As illustrated in FIG. 12, in one or more embodiments, when input information of a second user is received, the display device 100 may display the pop-up window 1210 including input information of the second user on a content reproduction screen.

Hereinafter, a method of sharing, by the mobile device 200, information with the display device 100 will now be described in detail with reference to FIG. 13.

Figure 13:
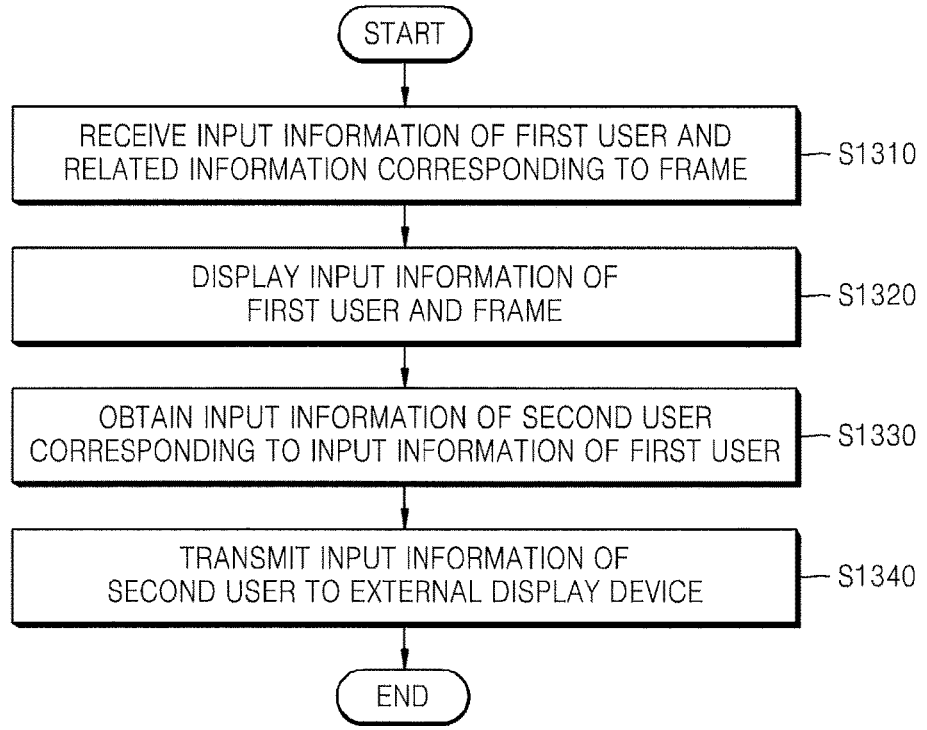
FIG. 13 is a flowchart of a method of sharing information, performed by a mobile device, according to one or more embodiments.

FIG. 13 is a flowchart of a method of sharing information, performed by the mobile device 200, according to one or more embodiments.

While the display device 100 on the outside of the mobile device 200 reproduces content, the mobile device 200 may receive input information of a first user and related information from the display device 100, wherein the related information corresponds to at least one frame that is included in the reproduced content (operation S1310).

In one or more embodiments, the input information of the first user may include, for example, at least one of a text message, a voice message, and an image, etc., that occur in response to the input by the first user. The input message of the first user may also include an input occurrence time of the first user, an input elapsed-time of the first user, an input end time of the first user, an input occurrence position of the first user, or the like. The input occurrence position of the first user may mean a position on a screen of the display device 100 at which the input by the first user occurs, and may be formed of a relative coordinates value. For example, if it is assumed that each of a horizontal length and a vertical length of the screen of the display device 100 is 100%, when the input by the first user occurs at a position that is 60% of the horizontal length from a left side end of the screen and 40% of the vertical length from a top of the screen, the input occurrence position of the first user may be (0.6, 0.4).

In one or more embodiments, the at least one frame may be selected by the display device 100, based on a reception time of the input information of the first user. For example, the at least one frame may include a frame that corresponds to the input occurrence time of the first user, a frame that corresponds to the input end time of the first user, frames that are selected at regular intervals during the input elapsed-time of the first user, a frame that is changed during the input elapsed-time of the first user, or the like.

The related information corresponding to at least one frame may include the frame that is selected upon reception of the input information of the first user, reproduction position information of the selected frame, sequence information of the selected frame, object information about an object that is included in the selected frame, or the like.

That is, if the mobile device 200 does not reproduce content that is being reproduced by the display device 100, the mobile device 200 may directly receive a frame or an object included in the frame from the display device 100. However, when the mobile device 200 reproduces content that is being reproduced by the display device 100, the mobile device 200 may receive, instead of a frame, reproduction position information of the frame or sequence information of the frame from the display device 100. This is because the mobile device 200 may select the frame from the reproduced content, based on the received reproduction position information of the frame or the received sequence information of the frame.

The mobile device 200 may display the input information of the first user and the at least one frame that are received from the display device 100 (operation S1320). That is, the mobile device 200 may display the received frame (or an object) and the input information of the first user on its screen, or may extract a corresponding frame based on the reproduction position information of the frame or the sequence information of the frame and may display the frame and the input information of the first user on its screen.

In one or more embodiments, the mobile device 200 may obtain input information of a second user that may correspond to the input information of the first user (operation S1330). For example, the mobile device 200 may recognize at least one of, for example, a touch input, a voice input, a key input, a motion input, and a bending input by the second user, etc., which may correspond to the input information of the first user. That is, the second user may input, into the mobile device 200, a response message with respect to the input message of the first user, by using one of various methods including the touch input, the voice input, the key input, the motion input, and the bending input, etc.

The input information of the second user may include not only text but also may include, for example, a picture, a diagram, a search result, at least one frame included in reproduced content, or the like. For example, when the first user asks an inquiry related to the content that is reproduced in the display device 100, the second user may answer the inquiry of the first user, may search for content related to the inquiry of the first user via a search website, or may input a new inquiry, which is related to the content that is reproduced in the display device 100, into the mobile device 200.

The mobile device 200 may transmit the input information of the second user, to the display device 100 on the outside of the mobile device 200 (operation S1340). The mobile device 200 may transmit the input information of the second user and at least one frame that is selected based on the input information of the second user, to the display device 100. Here, the mobile device 200 may adjust a compression rate of the selected frame or a total number of frames to be transmitted.

Hereinafter, with reference to FIGS. 14 through 17, a method of sharing, by the mobile device 200, information with the display device 100 will now be described in more detail.

Figure 14:
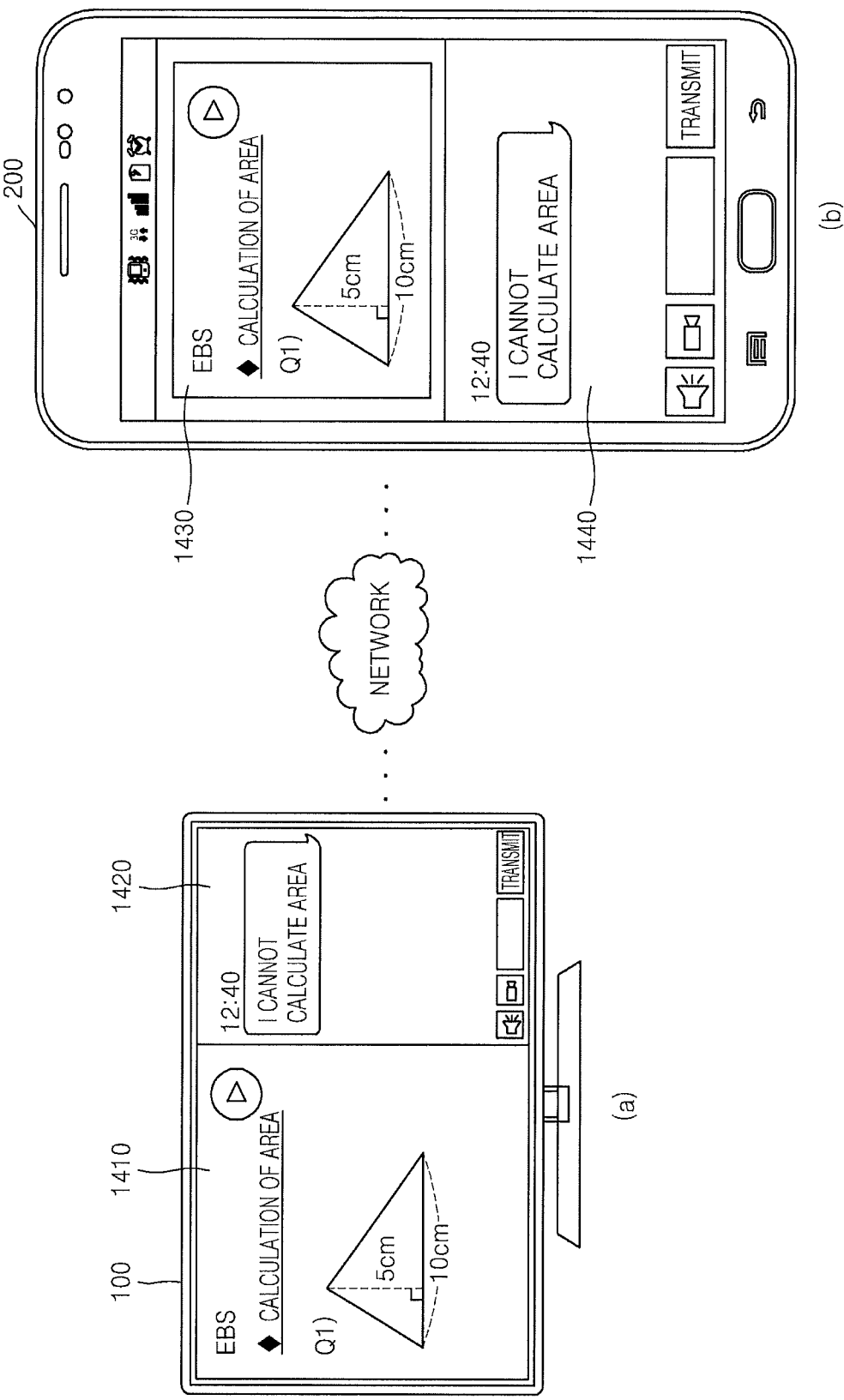
FIG. 14 illustrates an example in which the mobile device reproduces the same content as content that is reproduced in the display device, according to one or more embodiments.

FIG. 14 illustrates an example in which the mobile device 200 reproduces the same content as content that is reproduced in the display device 100, according to one or more embodiments.

As illustrated in FIG. 14, the display device 100 and the mobile device 200 may reproduce the same education content. Here, as illustrated in FIG. 14(*a*), when a first user inputs a message of "I cannot calculate an area." into the display device 100, the display device 100 may recognize the input by the first user and may select a frame that corresponds to an input occurrence time of the first user. Then, the display device 100 may transmit input information ("input message: I cannot calculate an area", "input occurrence time: 12:40 p.m., or the like) of the first user, and reproduction position information or sequence information of the selected frame, to the mobile device 200.

As illustrated in FIG. 14(*b*), the mobile device 200 may extract a corresponding frame based on the reproduction position information or the sequence information, may display the extracted frame on a first area 1430, and may display the input information ("input message: I cannot calculate an area", "input occurrence time: 12:40 p.m., or the like) of the first user, on a second area 1440.

Here, a ratio of an area 1410 for displaying the content and an area 1420 for displaying the input information of the first user, in the display device 100, may be different from a ratio of the first area 1430 for displaying the content and the second area 1440 for displaying the input information of the first user, in the mobile device 200.

Figure 15:
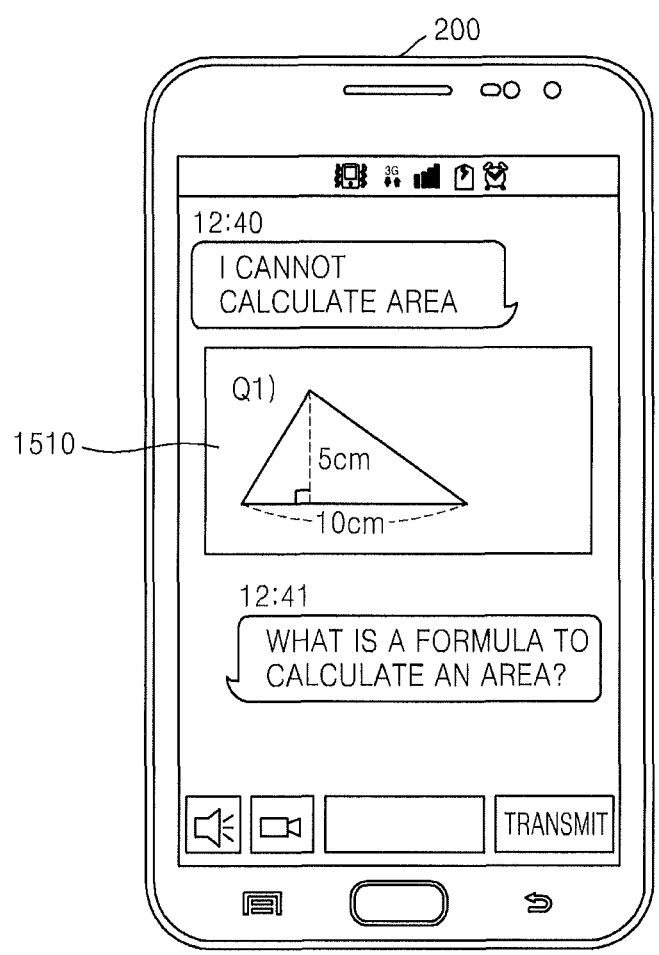
FIG. 15 illustrates a screen of the mobile device which displays input information of a user, according to one or more embodiments.

FIG. 15 illustrates a screen of the mobile device 200, which may display input information of a user, according to one or more embodiments.

The mobile device 200 may display input information of a first user and input information of a second user on a share window from which the mobile device 200 shares information with the display device 100. In one or more embodiments, the share window may include, for example, at least one of a shared memo-pad, a shared white board, and a message window, etc.

For example, as illustrated in FIG. 15, the mobile device 200 may display, on its screen, input information ("input message: I cannot calculate an area", "input occurrence time: 12:40 p.m., or the like) of the first user, which is received from the display device 100, and input information ("input message: What is a formula to calculate an area?", "input occurrence time: 12:41 p.m., or the like) of the second user, which corresponds to the input information of the first user.

Here, when the mobile device 200 does not reproduce the same content as content that is reproduced in the display device 100, the mobile device 200 may display a frame (or an object) 1510 that is received from the display device 100, and the input information of the first user, on its screen.

Figure 16:
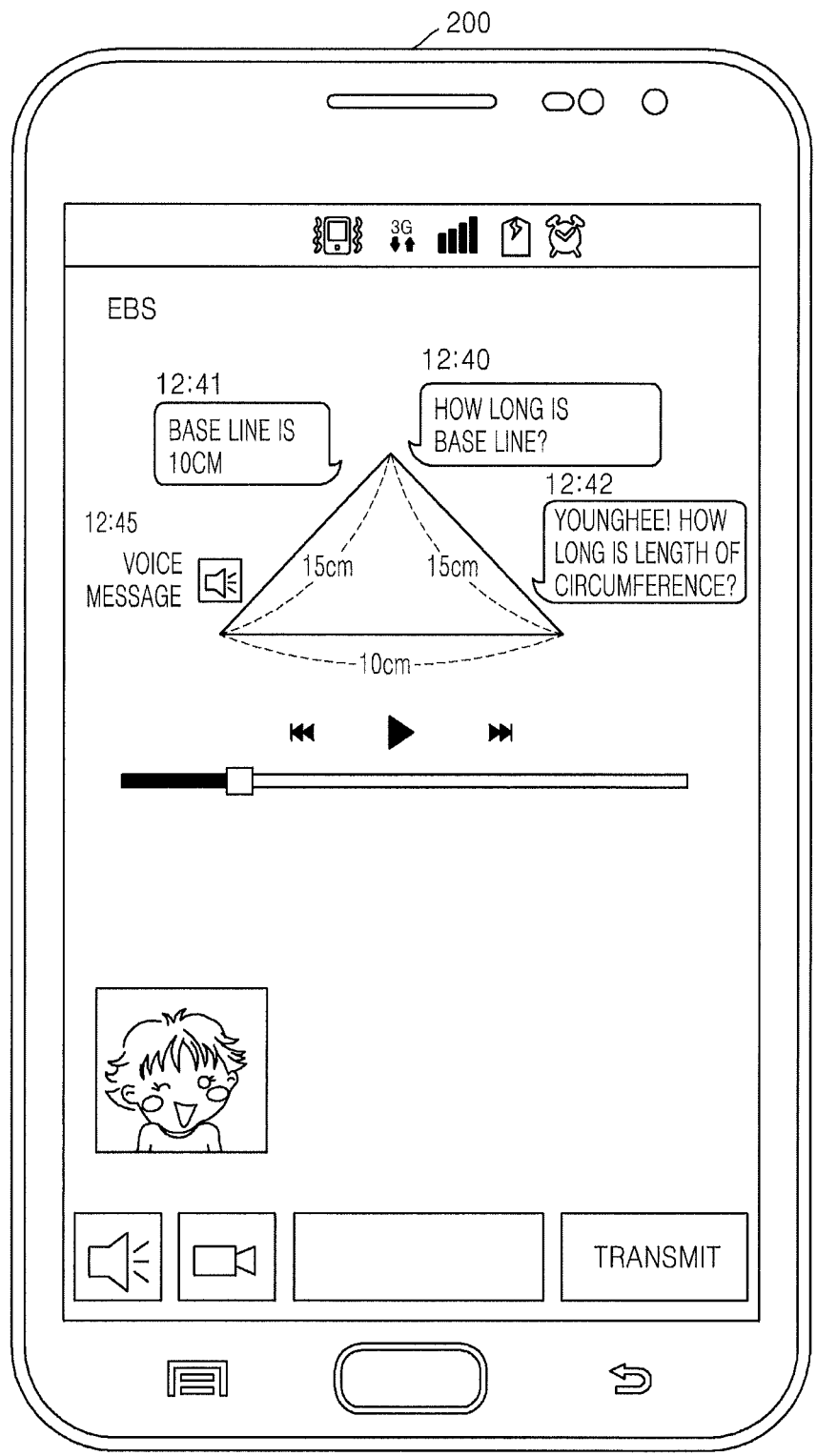
FIG. 16 illustrates an example in which the mobile device displays and overlays input information of a user on a content reproduction screen, according to one or more embodiments.

FIG. 16 illustrates an example in which the mobile device 200 displays and overlays input information of a user on a content reproduction screen, according to one or more embodiments.

In one or more embodiments, the mobile device 200 may display and overlay input information of a first user and input information of a second user on an area for displaying content. For example, as illustrated in FIG. 16, the input information (e.g., "A base line is 10 cm") of the first user and the input information (e.g., "How long is a base line?" of the second user are overlaid on a screen on which education content is reproduced.

Figure 17:
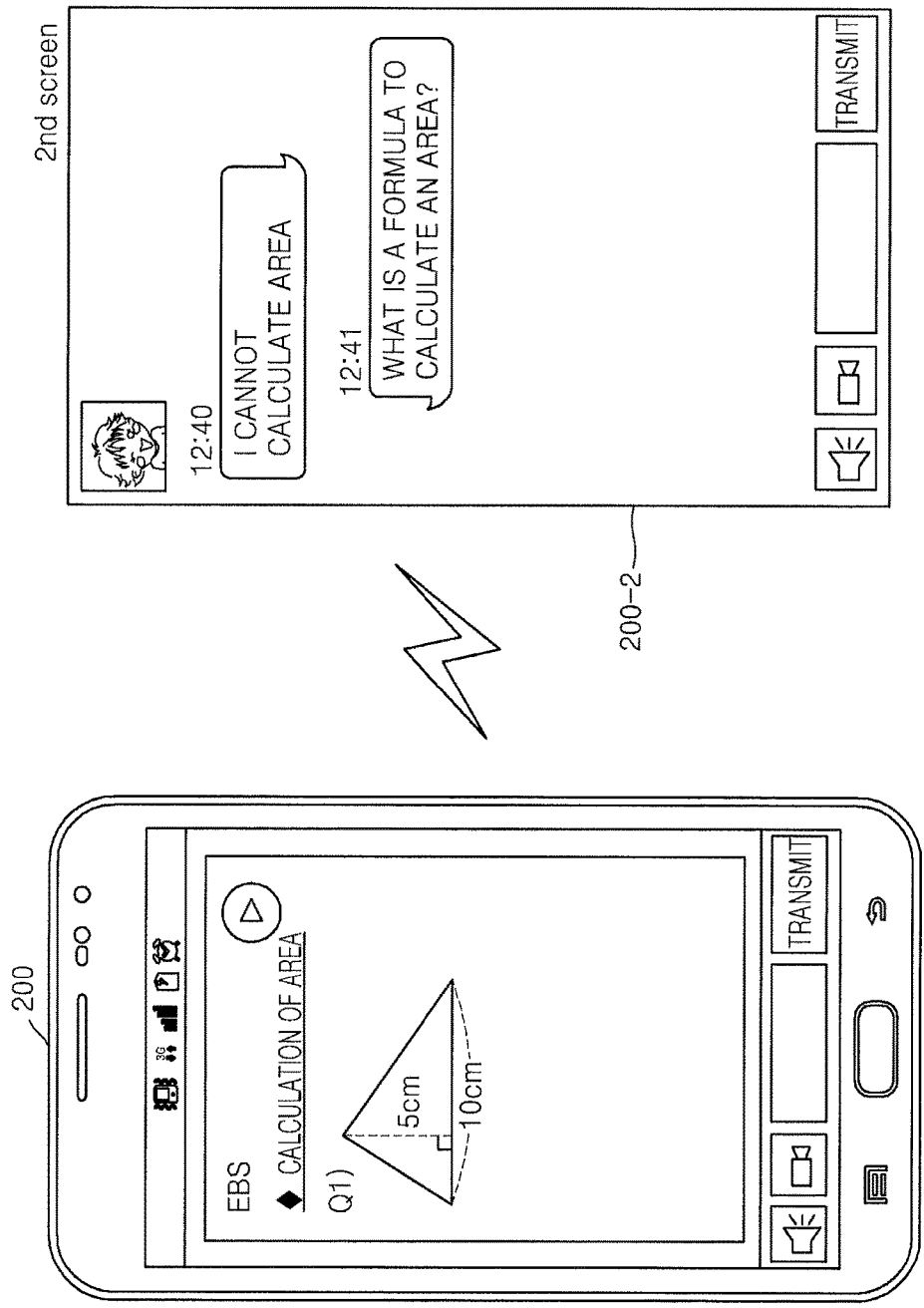
FIG. 17 illustrates an example in which input information of a user is displayed on a screen (i.e., a second screen) of another device that is connected with the mobile device, according to one or more embodiments.

FIG. 17 illustrates an example in which input information of a user is displayed on a screen (i.e., a second screen) of another device 200-2 that is connected with the mobile device 200, according to one or more embodiments.

In one or more embodiments, the mobile device 200 may display a share window including input information of a first user and input information of a second user, on the second screen of the other device 200-2 that is connected with the mobile device 200. The other device 200-2 may be connected with the mobile device 200 in a wired manner or via NFC. Examples of the NFC may include, but are not limited to, Wi-Fi, Bluetooth, ZigBee, Wi-Fi Direct (WFD), UWB, and infrared Data Association (IrDA).

As illustrated in FIG. 17, the mobile device 200 may reproduce and display content on a screen of the mobile device 200, and the other device 200-2 that is connected with the mobile device 200 may display the share window including the input information of the first user and the input information of the second user.

Figure 18:
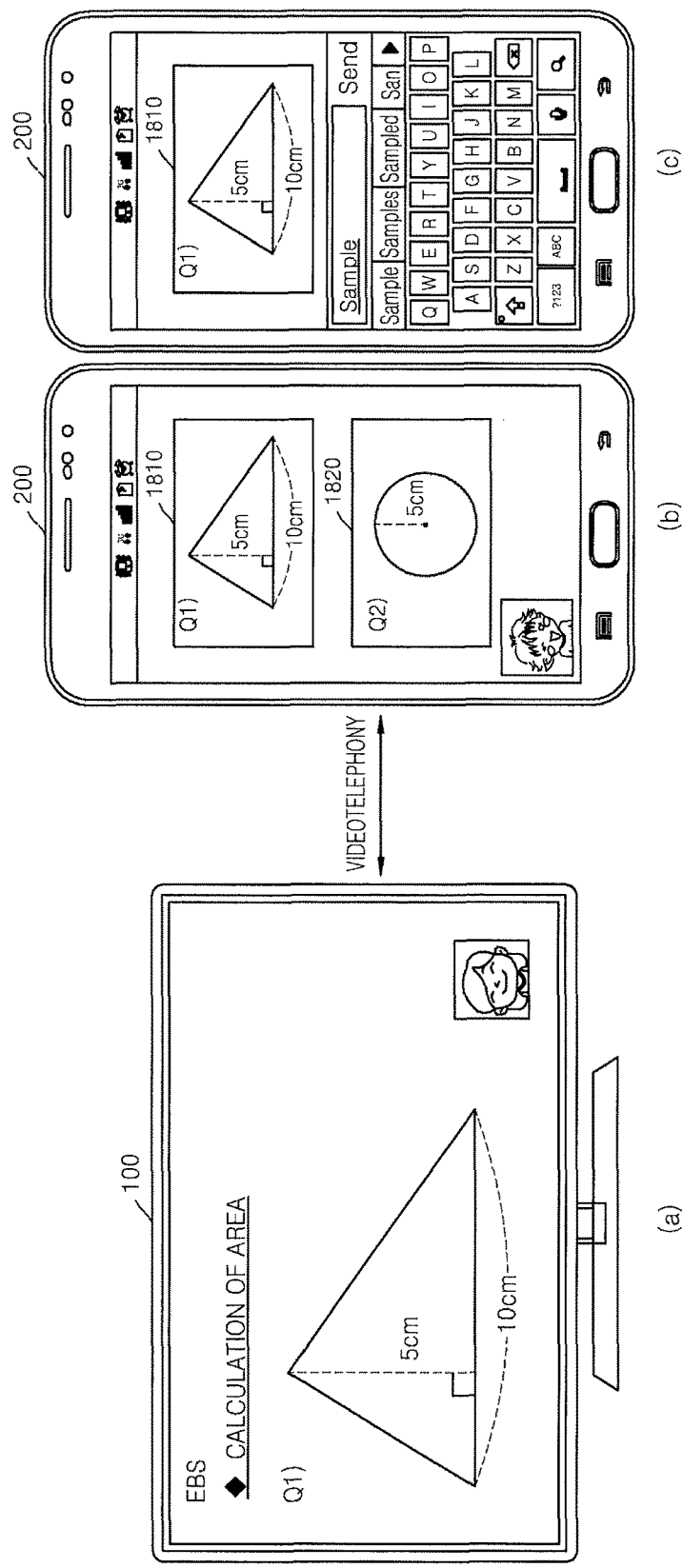
FIG. 18 illustrates an example in which a plurality of pieces of input information of a second user that correspond to a plurality of frames, respectively, are obtained by the mobile device, according to one or more embodiments.

FIG. 18 illustrates an example in which a plurality of pieces of input information of a second user that correspond to a plurality of frames, respectively, are obtained by the mobile device 200, according to one or more embodiments.

As illustrated in FIGS. 18(a), 18(b) and 18(c), the mobile device 200 may sequentially receive frames 1810 and 1820 from the display device 100 and may display them on its screen. In this case, when the second user selects the frame 1810 to be answered, the mobile device 200 may display a virtual keyboard as in FIG. 18(c) for an input of a response message with respect to the selected frame 1810. When the second user inputs a message by using the virtual keyboard, the display device 100 may transmit information about the selected frame 1810 and the input information of the second user, to the display device 100. For example, the mobile device 200 may overlay the input information of the second user on the selected frame 1810 and then may transmit it the selected frame 1810 having the overlaid information to the display device 100.

Thus, the first user may recognize which inquiry of the first user is answered by the second user.

Figure 19:
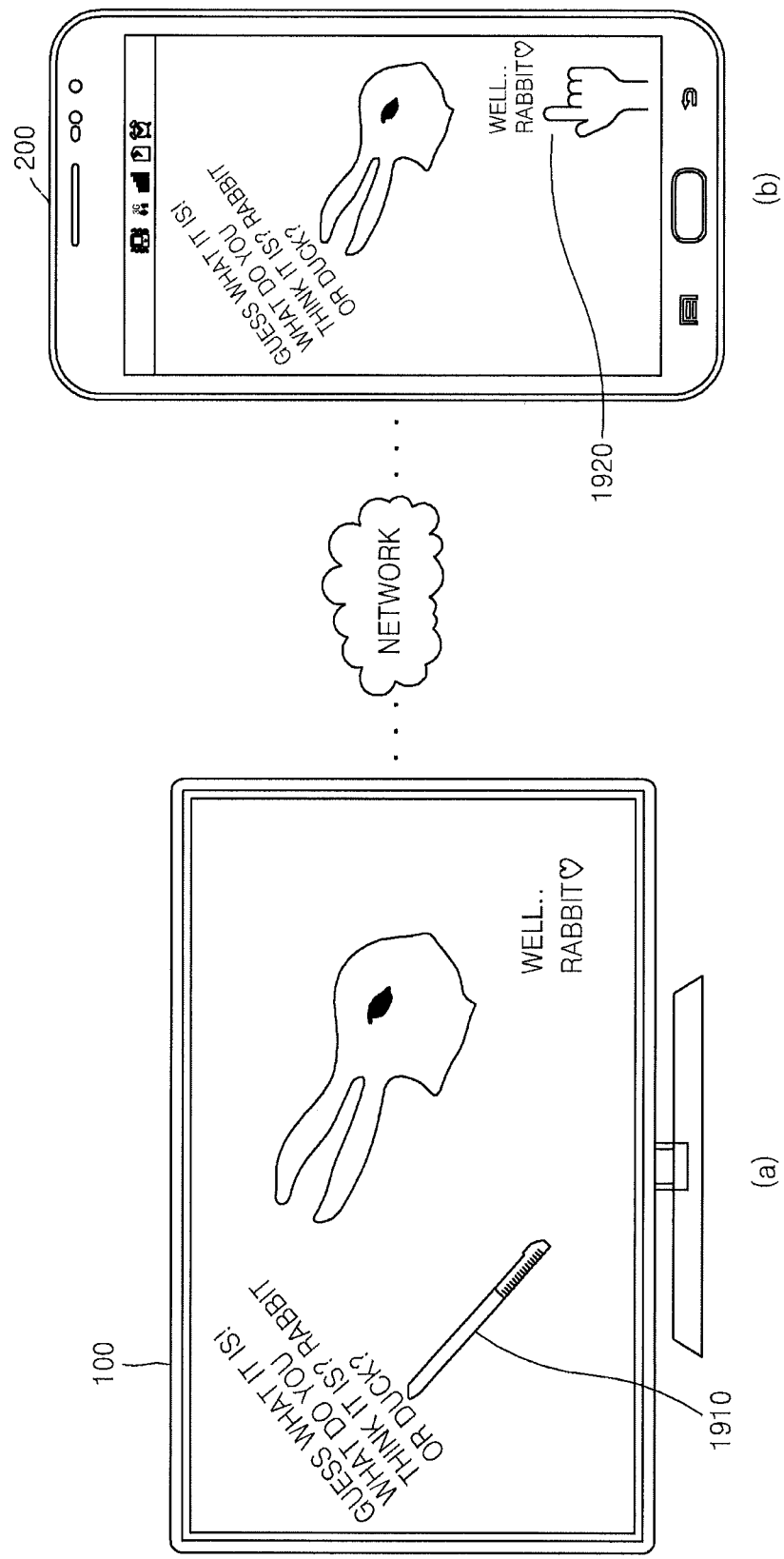
FIG. 19 illustrates a shared white board session, according to one or more embodiments.

FIG. 19 illustrates a shared white board session, according to one or more embodiments.

As illustrated in FIG. 19, in one or more embodiments, the display device 100 and the mobile device 200 may share information via the shared white board session. In the shared white board session, a first user and a second user may simultaneously input information.

For example, as illustrated in FIG. 19(a), the first user may input text of "Guess what it is! What do you think it is? A rabbit or a duck?" into the display device 100. Here, as illustrated in FIG. 19(b), the second user may input text and figure of "Well . . . rabbit♡" into the mobile device 200. That is, in the shared white board session, each of the first user and the second user may input text or a figure that each user wants, regardless of an input by the other party.

According to one or more embodiments, in the shared white board session, the display device 100 may transmit input information 1910 of the first user, to the mobile device 200, and the mobile device 200 may transmit input information 1920 of the second user, to the display device 100. Here, the input information 1910 of the first user and the input information 1920 of the second user may include information about respective input occurrence positions of the first user and of the second user. Thus, the display device 100 and the mobile device 200 may display the input information 1910 of the first user and the input information 1920 of the second user with regard to their respective input occurrence positions.

Figure 20A:
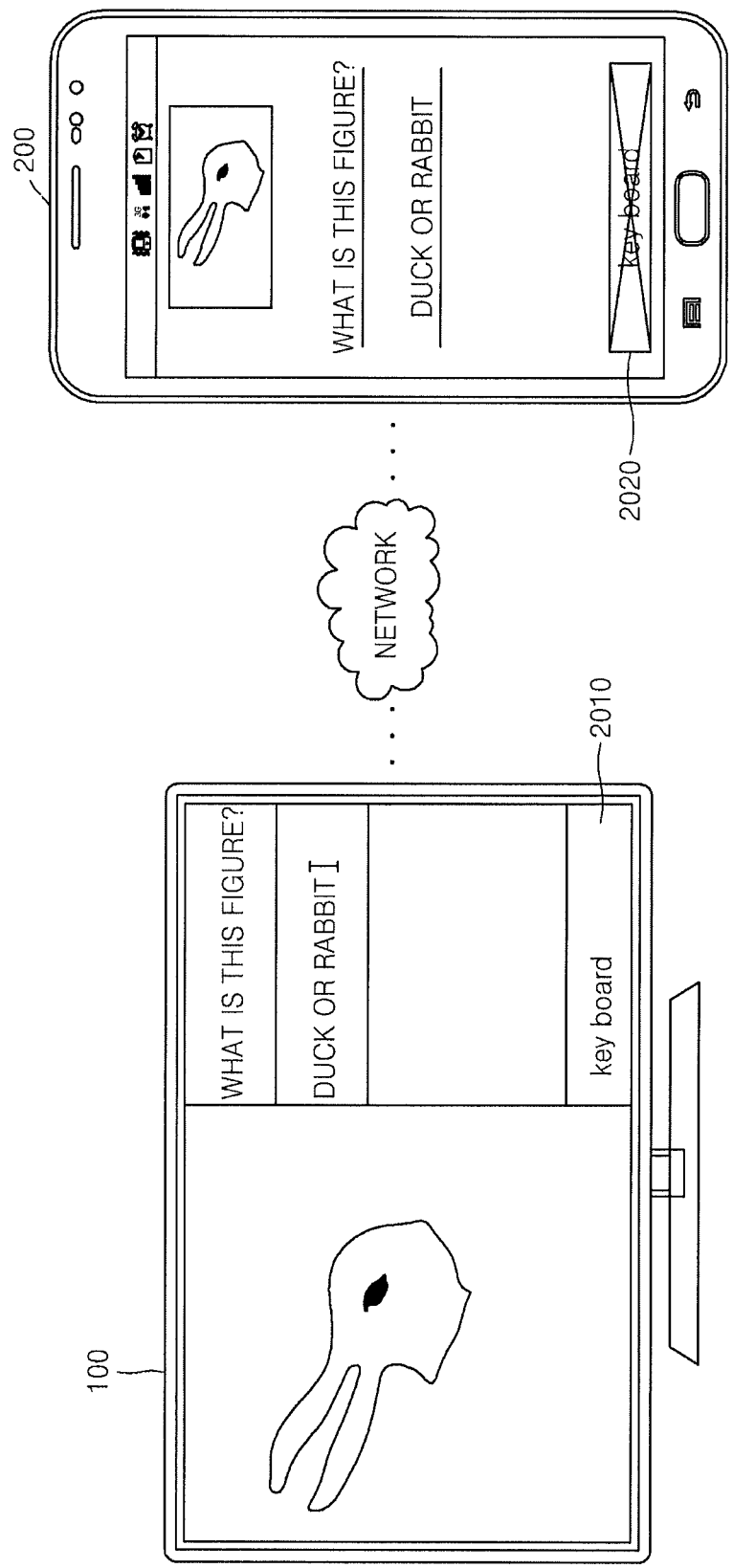
FIGS. 20A and 20B illustrate a shared memo pad session, according to one or more embodiments.
Figure 20B:
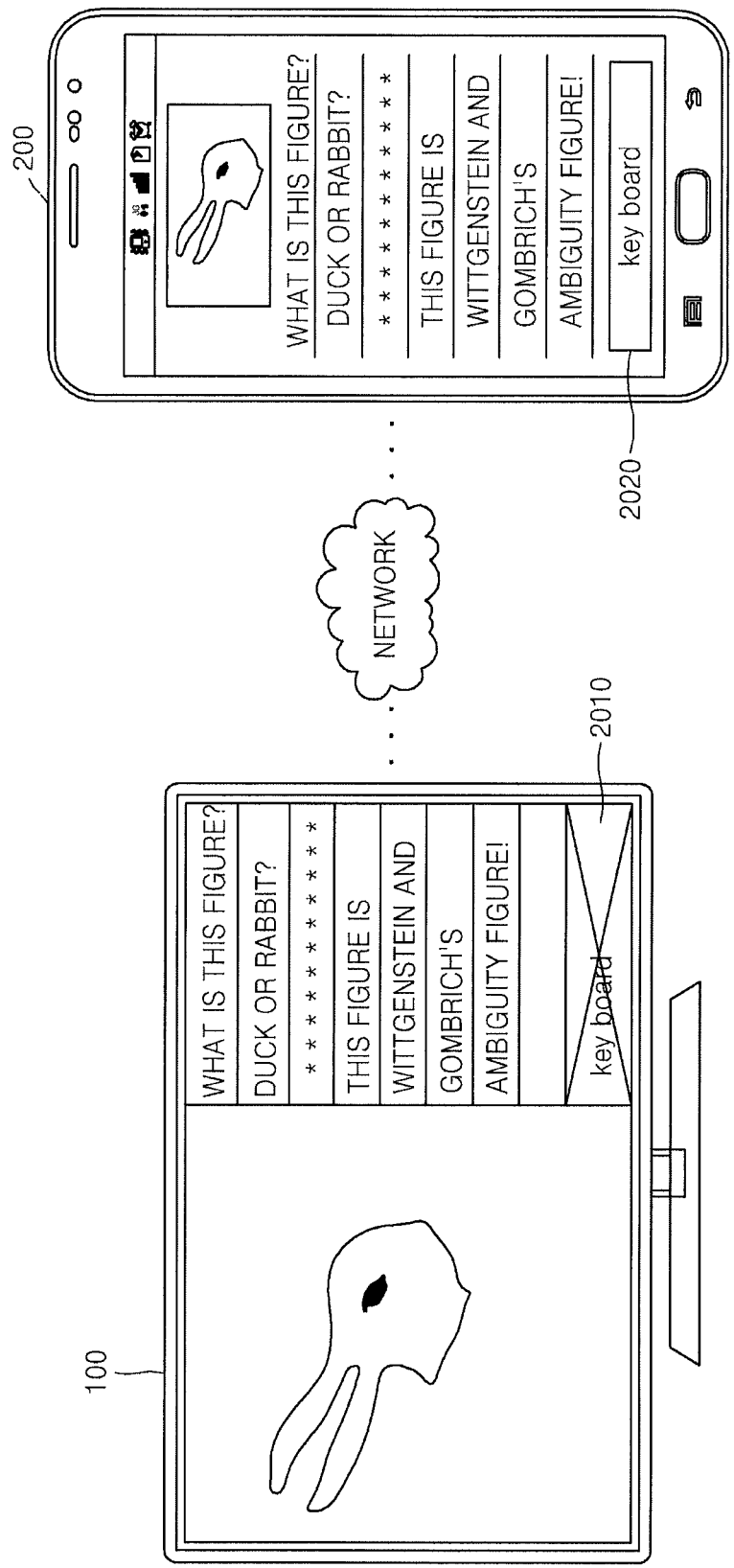

FIGS. 20A and 20B illustrate a shared memo pad session, according to one or more embodiments.

In the shared memo pad session, only one of an input function of the display device 100 and an input function of the mobile device 200 may be activated at a time. That is, when a first user inputs text into a shared memo pad of the display device 100, a second user cannot input text into a shared memo pad of the mobile device 200, and when the second user inputs text into the shared memo pad of the mobile device 200, the first user cannot input text into the shared memo pad of the display device 100.

For example, as illustrated in FIG. 20A, when the first user inputs text of "What is this figure? Duck or rabbit" in the display device 100, the second user may check content of the text, which is input by the first user via the shared memo pad of the mobile device 200, but the second user cannot input text into the shared memo pad.

Conversely, as illustrated in FIG. 20B, when the second user inputs text of "This figure is Wittgenstein and Gombrich's ambiguity figure!" via the mobile device 200, the first user may check content of the text, which is input by the second user via the shared memo pad of the display device 100, but the first user cannot input text into the shared memo pad.

That is, when the display device 100 transmits, to the mobile device 200, input information of the first user and information indicating that the first user is currently inputting text into the shared memo pad, the mobile device 200 may restrict the input function of the shared memo pad of the mobile device 200. Also, when the display device 100 receives, from the mobile device 200, input information of the second user and information indicating that the second user is currently inputting text into the shared memo pad, the display device 100 may restrict the input function of the shared memo pad of the display device 100.

In one or more embodiments, the mobile device 200 may request connection to the display device 100. Then, the mobile device 200 may receive a connection acceptance message from the display device 100, as a response to the request.

Also, the mobile device 200 may request authentication with respect to a remote control to the display device 100. When the mobile device 200 receives a remote control acceptance message from the display device 100, as a response to the request, the mobile device 200 may control the display device 100 from a remote place. The display device 100 may authenticate control authority of the mobile device 200 by referring to ID information of the second user, ID information of the mobile device 200, one-time use authentication information, or the like.

The mobile device 200 that is authenticated with respect to the control authority may control at least one of a change of a reproduction position of the content that is reproduced in the display device 100, a reproduction stop, an adjustment of reproduction speed, a volume adjustment, and a change of reproduction-target content. For example, when the second user adjusts a reproduction position of content that is displayed on the mobile device 200, the mobile device 200 may change the reproduction position in the display device 100 so as to synchronize the reproduction position of the content that is reproduced in the display device 100 and the reproduction position of the content that is reproduced in the mobile device 200.

The mobile device 200 that is authenticated with respect to the control authority may control installation, deletion, or execution of an application in the display device 100.

FIG. 21 is a flowchart of a method of sharing information via the server 300, according to one or more embodiments.

In operation S2105, the display device 100 and the mobile device 200 may set an interaction session via the server 300. For example, in one or more embodiments, when the mobile device 200 submits a request to the server 300 for connection with the display device 100, the server 300 may authenticate the mobile device 200 and may establish the interaction session between the mobile device 200 and the display device 100.

The server 300 may authenticate the mobile device 200 by using various methods. In one or more embodiments, the server 300 may, for example, authenticate the mobile device 200, based on ID information of the mobile device 200, ID information of a second user, or one-time use authentication information, etc.

In one or more embodiments, the server 300 may transmit a connection request from the mobile device 200 and the ID information of the mobile device 200 (or the ID information of the second user or the one-time use authentication information) to the display device 100. In this case, the display device 100 may authenticate the connection request from the mobile device 200, based on the ID information of the mobile device 200 (or the ID information of the second user or the one-time use authentication information).

In operation S2110, the server 300 may receive a frame transmission start message from the display device 100, and in operation S2115, the server 300 may transmit the frame transmission start message to the mobile device 200. In operation S2120, the server 300 may receive mobile device information (about a device state and a device capability) from the mobile device 200, and in operation S2125, the server 300 may transmit the mobile device information to the display device 100. The mobile device information may include network information (e.g., information about a bandwidth and an available communication method) of the mobile device 200, resolution of the mobile device 200, or the like.

In operation S2130, the display device 100 may determine a transmission method, based on the network information of the mobile 200, and in operation S2135, the display device 100 may adjust a compression rate of a frame to be transmitted, a total number of frames to be transmitted, resolution of a frame to be transmitted, or the like.

In operation S2140, the server 300 may receive input information of a first user and related information corresponding to a selected frame from the display device 100, and in operation S2145, the server may transmit the input information of the first user and the related information to the mobile device 200. In operation S2150, the mobile device 200 may display the input information of the first user and the selected frame on its screen, and may reproduce the same content as content that is reproduced in the display device 100.

In operation S2155, the server 300 may receive a reception completion notification message from the mobile device 200, and in operation S2160, the server 300 may transmit the reception completion notification message to the display device 100.

That is, in one or more embodiments, the server 300 may relay sharing of information between the display device 100 and the mobile device 200.

Figure 22:
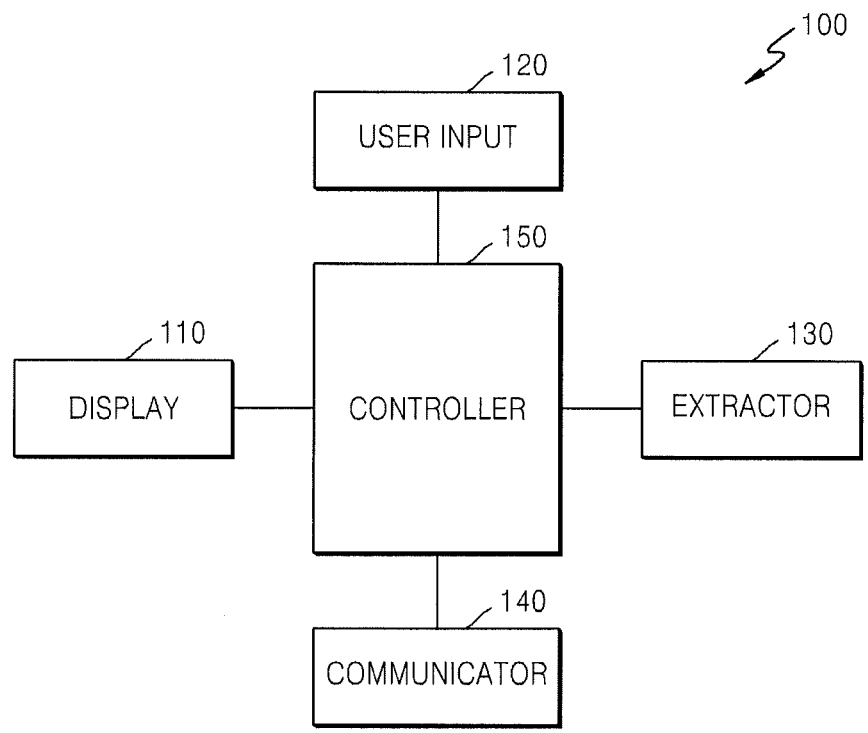
FIG. 22 is a block diagram illustrating a structure of the display device, according to one or more embodiments.

FIG. 22 is a block diagram illustrating a structure of the display device 100, according to one or more embodiments.

As illustrated in FIG. 22, the display device 100 may include a display 110, a user input 120, an extractor 130, a communicator 140, and a controller 150. However, not all shown elements are necessary elements. That is, the display device 100 may be embodied with more or less elements than the shown elements.

Hereinafter, the shown elements are described below.

The display 110 displays and outputs information that is processed by the display device 100. For example, the display 110 may reproduce content and may display the content on a screen of the display device 100. In one or more embodiments, the content may include broadcasting content, education content, music content, movie content, picture content, electronic book content, or the like.

The display 110 may display input information of a first user and input information of a second user on a share window for sharing information with the external device 200. The share window may include a shared memo-pad, a shared white board, a message window, or the like.

The display 110 may display and overlay the share window including the input information of the first user and the input information of the second user on an area of the screen that displays the content. Also, the display 110 may display and overlay the share window including the input information of the first user and the input information of the second user, on a screen of another device that is connected with the display device 100.

In one or more embodiments, when the display 110 and a touchpad form a layer structure and thus are formed as a touch screen, the display 110 may be used as both an output device and an input device. The display 110 may include, for example, at least one of a liquid crystal display (LCD), a thin film transistor-liquid crystal display (TFT-LCD), an organic light-emitting display device, a flexible display, a three-dimensional (3D) display, and an electrophoretic display, etc.

The user input 120 may be a means by which a user inputs data so as to control the display device 100. For example, the user may control power to be on or off, a change of channel, volume adjustment, a text input, or the like via the user input 120.

The user input 120 may be formed of a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, or the like.

In one or more embodiments, the user input 120 may include a remote control apparatus to control the display device 100 from a remote place. The remote control apparatus may include a TV remote controller, an integrated remote controller, a mobile terminal (e.g., a mobile phone, a smart phone, a tablet PC, an MP3 player, or the like) that has a remote control function, or the like.

Also, the user input 120 may include one or more modules to receive data from a user. For example, the user input 120 may include a motion recognition module, a touch recognition module, a voice recognition module, a bending motion recognition module, or the like.

The motion recognition module may recognize motion of the remote control device or the user, and may transmit information about the recognized motion to the controller 150. In one or more embodiments, the motion recognition module may recognize motion of the remote control device or the user, by using a camera. In one or more embodiments, the camera may include a depth camera, a multi-view camera, or the like. The depth camera may measure distance information of objects within a scene in real-time by using, for example, Time-of-Flight (TOF) technology, and a measured value may be output as a depth image to be used in making a high quality depth map of the scene.

The touch recognition module may recognize a touch gesture on the touch screen and may transmit information about the touch gesture to the controller 150. In order to recognize a touch or a proximate touch on the touch screen, the touch screen may internally or externally have various sensors. An example of the sensor to detect the touch on the touch screen may include a tactile sensor. The tactile sensor may detect a contact of a specific object at least as much as a person can detect. The tactile sensor may detect various types of information such as roughness of a contact surface, hardness of the contact object, temperature of a contact point, or the like.

Also, another example of the sensor to detect the touch on the touch screen may include a proximity sensor.

The proximity sensor may detect existence of an object that approaches a predetermined detection surface or that exists nearby, by using a force of an electro-magnetic field or an infrared ray, without using a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, or the like.

The voice recognition module may recognize a voice of the user by using a voice recognition engine, and may transmit the recognized voice to the controller 150.

In one or more embodiments, the bending motion recognition module may include a bending sensor to detect a bending motion. The bending motion recognition module may collect a plurality of pieces of information about the bending motion from a plurality of bending sensors and may analyze the plurality of pieces of information. Regarding the bending motion, the bending motion recognition module may obtain the plurality of pieces of information about a bended position (i.e., a coordinates value), a bending direction, a bending angle, a bending strength, a bending speed, a total number of times of the bending motion, a start time of the bending motion, and an elapsed-time of the bending motion.

For example, the bending motion recognition module may obtain the information about the bended position and the information about the bending direction, by using a factor that a pressure at a bended portion is different from a pressure at a non-bended portion. Also, the bending motion recognition module may obtain the information about the bending angle, a bending radius, the total number of times of the bending motion, the bending speed, or the like, based on variation in power at the bended portion. Alternatively, the bending motion recognition module may measure a deformation speed of each portion by using an acceleration sensor and may connect positions having large speed variation, so that the bending motion recognition module may obtain the information about the bended position and the bending angle.

The user input 120 may obtain input information of the first user while content is reproduced and displayed on the screen of the display device 100. The user input 120 may receive at least one of a touch input, a voice input, a key input, a motion input, and a bending input by the first user, which are related to the reproduced content. In one or more embodiments, the input information of the first user may include at least one of a text message, a voice message, and an image that occur in response to an input by the first user.

The user input 120 may recognize at least one of an input message of the first user, an input occurrence time of the first user, an input elapsed-time of the first user, an input end time of the first user, and an input occurrence position of the first user.

Also, the user input 120 may generate an inquiry message about the content, based on the input by the first user.

The extractor 130 may extract information about the input by the first user from the reproduced content. That is, the extractor 130 may select at least one frame of the content that is reproduced in the display device 100, based on a reception time of the input information of the first user (i.e., a reception time of the input by the first user). In one or more embodiments, the extractor 130 may select the at least one frame included in the content, based on at least one of the input occurrence time of the first user, the input elapsed-time of the first user, and the input end time of the first user. Also, the extractor 130 may select a frame that corresponds to a change of a reproduction screen of the content, while the input by the first user is maintained.

That is, the display device 100 may select a frame corresponding to the input occurrence time of the first user, a frame corresponding to the input end time of the first user, frames selected at a predetermined interval during the input elapsed-time of the first user, or a frame that is changed during the input elapsed-time of the first user.

The communicator 140 may include one or more elements for enabling communication between the display device 100 and the external device 200 or communication between the display device 100 and the server 300. For example, the communicator 140 may include a broadcasting reception module, a wireless internet module, a wired internet module, an NFC module, or the like.

The broadcasting reception module may receive a broadcasting signal and/or broadcasting-related information from an external broadcasting control server (not shown) via a broadcasting channel. The broadcasting channel may include, for example, a satellite channel and a terrestrial channel, etc.

The wireless internet module is for accessing a wireless internet connection. The wireless internet module may be embedded in the display device 100 or may be arranged outside the display device 100. The wired internet module is for access to a wired internet connection.

The NFC module is for NFC. Examples of the NFC may include, but are not limited to, Wi-Fi, Bluetooth, ZigBee, WFD, UWB, and IrDA.

The communicator 140 may transmit the related information corresponding to the selected frame and the input information of the first user to the external device 200. Here, according to one or more embodiments, the communicator 140 may transmit the selected frame to the external device 200. Alternatively, instead of the selected frame, the communicator 140 may transmit reproduction position information of the selected frame, sequence information of the selected frame, object information about an object that may be included in the selected frame, or the like to the external device 200. Also, the communicator 140 may transmit the input information of the first user to the external device 200 via, for example, at least one of a voice call signal, a videotelephony signal, and a message transmission signal, etc.

The communicator 140 may receive a connection request from the external device 200 and then may transmit a connection acceptance message to the external device 200. Also, in response to the input information of the first user, the communicator 140 may receive the input information of the second user from the external device 200.

Alternatively, the communicator 140 may request connection to the external device 200 and may receive a connection acceptance message from the external device 200.

The controller 150 may control all operations of the display device 100. That is, the controller 150 may generally control the display 110, the user input 120, the extractor 130, and the communicator 140.

The controller 150 may adjust at least one of a compression rate of the selected frame, resolution of the selected frame, and a total number of frames to be transmitted. Also, the controller 150 may authenticate connection with the external device 200, in response to the connection request from the external device 200. Here, the controller 150 may authenticate the connection with the external device 200 by using at least one of ID information of the external device 200, ID information of the second user, and one-time use authentication information.

The controller 150 may map an output signal of a predetermined application of the external device 200 with a virtual broadcasting channel. The predetermined application may be used by the external device 200 to share information with the display device 100.

Figure 23:
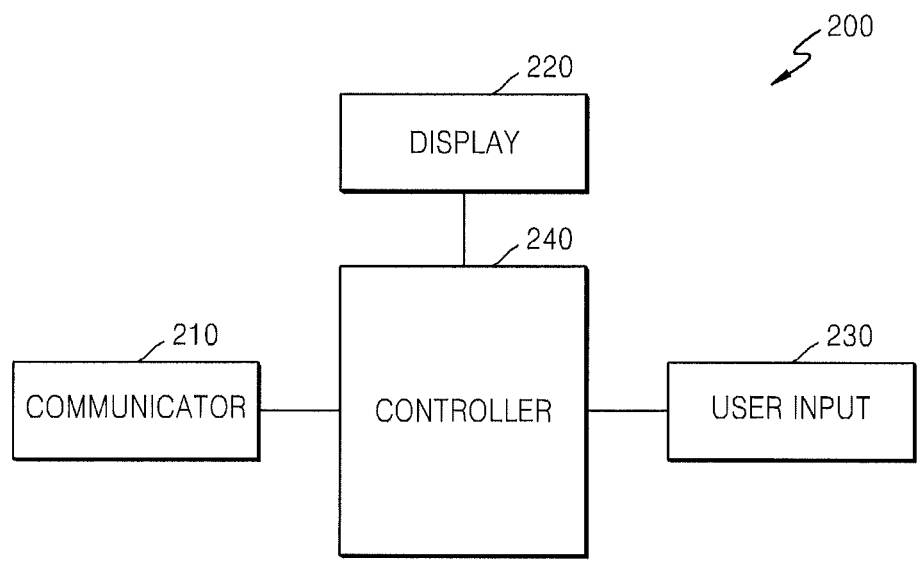
FIG. 23 is a block diagram illustrating a structure of the mobile device, according to one or more embodiments.

FIG. 23 is a block diagram illustrating a structure of the mobile device 200, according to one or more embodiments.

As illustrated in FIG. 23, the mobile device 200 may include a communicator 210, a display 220, a user input 230, and a controller 240. However, not all shown elements are necessary elements. That is, the mobile device 200 may be embodied with more or less elements than the shown elements.

Hereinafter, the shown elements are described below.

The communicator 210 may include one or more elements for enabling communication between the mobile device 200 and the display device 100 or communication between the mobile device 200 and the server 300. For example, the communicator 210 may include a mobile communication module, a wireless internet module, an NFC module, a position information module, or the like.

The mobile communication module transceives a wireless signal with at least one of a base station in a mobile communication network, the display device 100, and the server 300. Here, the wireless signal may include various types of data according to transception of a voice call signal, a videotelephony call signal, or text/multimedia messages, etc.

The wireless internet module is for accessing wireless Internet. The wireless internet module may be embedded in the mobile device 200 or may be arranged outside the mobile device 200.

The NFC module is for NFC. Examples of the NFC may include, but is not limited to, Wi-Fi, Bluetooth, ZigBee, WFD, UWB, and IrDA.

The communicator 210 may receive input information of a first user and related information corresponding to at least one frame from the display device 100, wherein the input information of the first user may be about content that is reproduced in the display device 100, and the at least one frame may be obtained during reproduction of the content. Also, the communicator 210 may transmit, to the display device 100, input information of a second user that may correspond to the input information of the first user.

The communicator 210 may request connection to the display device 100, and may receive a connection acceptance message from the display device 100. Also, the communicator 210 may request the display device 100 for control authority with respect to a remote control, and may receive a remote control acceptance message from the display device 100.

The display 220 may display and output information that may be processed by the mobile device 200. For example, the display 220 may display the input information of the first user and the at least one frame on a screen of the mobile device 200. Here, the display 220 may display the input information of the first user and the input information of the second user on a share window of the screen, wherein the share window is for sharing information with the display device 100. Also, the display 220 may display and overlay the input information of the first user and the input information of the second user on an area of the screen that displays the content.

Also, the display 220 may display and overlay the share window including the input information of the first user and the input information of the second user on a screen of another device that may be connected with the mobile device 200.

The display 220 may reproduce and display the same content as the content that is reproduced in the display device 100.

The user input 230 may be a means by which a user may input data so as to control the mobile device 200. For example, the user input 230 may be formed of a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, or the like. In particular, when the touch pad and the display 220 form a mutual layer structure, this structure may be called a touch screen.

The user input 230 may recognize at least one of a touch input, a voice input, a key input, a motion input, and a bending input by the second user. That is, the user input 230 may include at least one module to receive data from a user. For example, the user input 230 may include a motion recognition module, a touch recognition module, a voice recognition module, a bending motion recognition module, or the like. The motion recognition module may recognize a motion of the mobile device 200, and may transmit information about the motion of the mobile device 200 to the controller 240.

The motion recognition module may include various types of a sensor to recognize the motion of the mobile device 200. For example, examples of the sensor may include an acceleration sensor, a tilt sensor, a gyro sensor, a 3-axis magnetic sensor, or the like.

The touch recognition module may recognize a touch gesture on the touch screen, and may transmit information about the touch gesture to the controller 240. The voice recognition module may recognize a voice of the user by using a voice recognition engine, and may transmit the recognized voice to the controller 240. In one or more embodiments, the bending motion recognition module may collect a plurality of pieces of information about a bending motion from a plurality of bending sensors and may analyze the plurality of pieces of information.

The user input 230 may obtain the input information of the second user that corresponds to the input information of the first user. The input information of the second user may include a second user's response message with respect to the input information of the first user, and may be input by the second user so that the second user may interact with the first user of the display device 100. The input information of the second user may include an input message of the second user that is obtained during reproduction of the content, an input occurrence time of the second user, an input elapsed-time of the second user, an input end time of the second user, an input occurrence position of the second user, or the like.

The controller 240 may control all operations of the mobile device 200. That is, the controller 240 may generally control the communicator 210, the display 220, and the user input 230.

When the display device 100 authenticates remote control authority of the mobile device 200, the controller 240 may control the display device 100 from a remote place. For example, the controller 240 may change a reproduction position of the content that is reproduced in the display device 100, may stop reproduction, may adjust reproduction speed, may adjust a volume, or may change reproduction target content, etc.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method, performed by a smart television, the method comprising:
    displaying content on a display of the smart television;
    receiving an inquiry from a user at a position, relative to a position of the content, on the display of the smart television, the inquiry including an inquiry message, the inquiry including an input occurrence position being the position, relative to the position of the content, on the display of the smart television where the inquiry occurred, and the inquiry being related to the content;
    obtaining the inquiry message about the content from the inquiry from the user;
    analyzing the inquiry to determine a time at which the user was inputting the inquiry message or at which inputting of the inquiry message by the user ended;
    selecting a frame of the content that was being displayed on the display of the smart television at the determined time at which the user was inputting the inquiry message or at which inputting of the inquiry message by the user ended;
    extracting information about the selected frame of the content, the extracted information being related to the inquiry message from the user, and
    transmitting the selected frame of the content, the extracted information, the input occurrence position, and the inquiry message to a mobile device that is connected with the smart television wirelessly or by wire, so that the mobile device uses the transmitted input occurrence position to display the inquiry message on the mobile device in a similar position, relative to the position of the content, to the position on the display of the smart television where the inquiry occurred.

2. The method of claim 1, wherein the receiving of the inquiry from the user further comprises analyzing the inquiry from the user and determining whether the inquiry from the user is related to the content.

3. The method of claim 2, wherein the determining comprises:
extracting an inquiry meaning unit by parsing the inquiry from the user; and
determining a relation between the inquiry meaning unit and the content, based on metadata of the content.

4. The method of claim 3, wherein the determining of the relation comprises:
obtaining a content meaning unit that is related to the content from the metadata of the content, by using ontology; and
comparing the content meaning unit with the inquiry meaning unit.

5. The method of claim 4, wherein the receiving of the inquiry from the user further comprises determining whether the inquiry from the user corresponds to a predetermined sentence structure.

6. The method of claim 4, wherein the receiving of the inquiry from the user comprises receiving at least one of a touch input, a voice input, a key input, a motion input, and a bending input.

7. The method of claim 4, wherein the receiving of the inquiry from the user comprises obtaining at least one of a text message, a voice message, and an image from the user.

8. The method of claim 4, wherein
the selected frame of the content corresponds to a point of time at which a reproduction screen of the content was changed during the inputting of the inquiry message.

9. The method of claim 4, wherein the extracted information comprises at least one of reproduction position information of the frame, sequence information of the frame, and object information about an object that is comprised in the frame.

10. The method of claim 4, wherein the transmitting further comprises adjusting at least one of a compression rate of a frame, a resolution of a frame, and a total number of frames to be transmitted.

11. The method of claim 4, further comprising receiving inquiry information of a user of the external device, from the external device.

12. The method of claim 11, further comprising displaying the inquiry message and the inquiry information of the user of the external device on a share window for sharing information with the external device.

13. The method of claim 12, wherein the share window comprises at least one of a shared memo pad, a shared white board, and a message window.

14. The method of claim 12, further comprising displaying and overlaying the share window on an area that displays the content.

15. The method of claim 12, further comprising displaying the share window on a screen of another device that is connected with the smart television.

16. The method of claim 4, wherein the content comprises at least one of broadcasting content, education content, music content, movie content, picture content, and electronic book content.

17. The method of claim 4, wherein the transmitting comprises transmitting the inquiry message by using at least one of a voice call signal, a videotelephony signal, and a message transmission signal.

18. The method of claim 4, further comprising:
receiving a connection request from the external device; and
authenticating a connection with the external device, in response to the connection request.

19. The method of claim 18, wherein the authenticating comprises authenticating the connection with the external device, based on at least one of identification (ID) information of the external device, ID information of a user of the external device, and one-time use authentication information.

20. The method of claim 4, further comprising:
transmitting a connection request to the external device; and
receiving a connection acceptance message from the external device, in response to the connection request.

21. A method of sharing, by a mobile device, information with a smart television, the method comprising:
receiving an inquiry message of a first user and related information from the smart television, wherein
the inquiry message of the first user is obtained while content is displayed on the smart television, and
the related information corresponds to at least one frame of the content that is displayed on the smart television and an input occurrence position being a position, relative to a position of the content, on the smart television where a user inquiry occurred, the at least one frame being extracted from the content by selecting the at least one frame upon determining that the at least one frame was being displayed on the smart television at a time at which the first user was inputting the inquiry message or at which inputting of the inquiry message by the user ended, the time having been determined by analyzing an inquiry containing the inquiry message of the first user;
displaying the inquiry message of the first user and the at least one frame, using the input occurrence position to display the inquiry message on the mobile device in a similar position, relative to the position of the content, to the position on the smart television where the user inquiry occurred;
obtaining an inquiry message of a second user that corresponds to the inquiry message of the first user; and
transmitting the inquiry message of the second user, to the smart television.

22. The method of claim 21, wherein the related information that corresponds to the at least one frame comprises a frame that is selected based on a point of time at which the inquiry message of the first user is received, reproduction position information of the selected frame, sequence information of the selected frame, or object information about an object that is comprised in the selected frame.

23. The method of claim 21, further comprising reproducing and displaying content on a screen of the mobile device, wherein the content matches the content that is reproduced in the smart television.

24. The method of claim 21, further comprising displaying the inquiry message of the first user and the inquiry message of the second user on a share window for sharing information with the smart television.

25. The method of claim 24, wherein the share window comprises at least one of a shared memo pad, a shared white board, and a message window.

26. The method of claim 23, further comprising displaying and overlaying the inquiry message of the first user and the inquiry message of the second user on an area that displays the content.

27. The method of claim 24, further comprising displaying the share window comprising the inquiry message of the first user and the inquiry message of the second user on a screen of a device, other than the smart television, that is connected with the mobile device.

28. The method of claim 21, wherein the content comprises at least one of broadcasting content, education content, music content, movie content, picture content, and electronic book content.

29. The method of claim 21, further comprising:
transmitting a connection request to the smart television; and
receiving a connection acceptance message from the smart television, in response to the connection request.

30. The method of claim 21, further comprising:
requesting authentication from the smart television with respect to remote control of the smart television; and
receiving a remote control acceptance message from the smart television, in response to the requesting.

31. The method of claim 30, further comprising controlling at least one of a change of a reproduction position of the content that is reproduced in the smart television, a reproduction stop, an adjustment of reproduction speed, a volume adjustment, and a change of reproduction-target content.

32. A smart television comprising:
a display;
a user interface;
a communication interface; and
a controller configured to:
control the display to display content on the display of the smart television;
control the user interface to receive, from a user at a position, relative to a position of the content, on the display of the smart television, an inquiry including an inquiry message, the inquiry including an input occurrence position being the position, relative to the position of the content, on the display of the smart television where the inquiry occurred, wherein the inquiry is related to the content;
control to obtain an inquiry message about the content from the inquiry from the user and extract information about a frame of the content by selecting the frame upon determining that the frame was being displayed on the display of the smart television at a time at which the user was inputting the inquiry message or at which inputting of the inquiry message by the user ended, the extracted information being related to the inquiry message from the user, the time having been determined by analyzing the inquiry from the user; and
control the communication interface to transmit the selected frame of the content, the input occurrence position, the extracted information, and the inquiry message to a mobile device, so that the mobile device uses the transmitted input occurrence position to display the inquiry message on the mobile device in a similar position, relative to the position of the content, to the position on the display of the smart television where the inquiry occurred.

33. The smart television of claim 32, wherein the controller analyzes the inquiry message from the user and determines whether the inquiry message from the user is related to the content.

34. The smart television of claim 33, wherein the controller extracts an inquiry meaning unit by parsing the inquiry message from the user, and determines a relation between the inquiry meaning unit and the content, based on metadata of the content.

35. The smart television of claim 34, wherein the controller obtains a content meaning unit that is related to the content from the metadata of the content, by using ontology, and compares the content meaning unit with the inquiry meaning unit.

36. The smart television of claim 32, wherein the controller determines whether the inquiry message from the user corresponds to a predetermined sentence structure.

37. The smart television of claim 32, wherein the controller controls the user interface to receive at least one of a touch input, a voice input, a key input, a motion input, and a bending input.

38. The smart television of claim 32, wherein the selected frame of the content corresponds to a point of time at which a reproduction screen of the content was changed during inputting of the inquiry message.

39. The smart television of claim 32, wherein the controller adjusts at least one of a compression rate of a frame, a resolution of a frame, and a total number of frames to be transmitted.

40. The smart television of claim 32, wherein the controller controls the communication interface to receive inquiry message of a user of the external device from the external device.

41. The smart television of claim 40, wherein the controller controls the display to display the inquiry message and the inquiry message of the user of the external device on a share window for sharing information with the external device.

42. The smart television of claim 41, wherein the controller controls the display to display and overlay the share window on an area that displays the content.

43. The smart television of claim 41, wherein the controller controls the display to display the share window on a screen of another device that is connected with the smart television.

44. The smart television of claim 32, wherein the controller controls the communication interface to transmit the inquiry message by using at least one of a voice call signal, a videotelephony signal, and a message transmission signal.

45. The smart television of claim 32, wherein the controller controls the communication interface to receive a connection request from the external device, and the controller authenticates a connection with the external device, in response to the connection request.

46. The smart television of claim 45, wherein the controller authenticates the connection with the external device, based on at least one of identification (ID) information of the external device, ID information of a user of the external device, and one-time use authentication information.

47. The smart television of claim 32, wherein the controller controls the communication interface to transmit a connection request to the external device, and to receive a connection acceptance message from the external device, in response to the connection request.

48. A mobile device for sharing information with a smart television, the mobile device comprising:
a communication interface;
a display;
a user interface; and
a controller configured to:
control the communication interface to:

receive an inquiry message of a first user and related information from the smart television, wherein the inquiry message of the first user is obtained while content is displayed on the smart television, and the related information corresponds to at least one frame of the content that is displayed on the smart television and an input occurrence position being a position, relative to a position of the content, on the smart television where a user inquiry occurred; and transmit an inquiry message of a second user that corresponds to the inquiry message of the first user, to the smart television, the at least one frame being extracted from the content by selecting the at least one frame upon determining that the at least one frame was being displayed on the smart television at a time at which the first user was inputting the inquiry message or at which inputting of the inquiry message by the first user ended, the time having been determined by analyzing an inquiry containing the inquiry message of the first user, control the display to display the inquiry message of the first user and the at least one frame, using the input occurrence position to display the inquiry message on the mobile device in a similar position, relative to the position of the content, to the position on the smart television where the user inquiry occurred, and control the user interface to obtain the inquiry message of the second user that corresponds to the inquiry message of the first user.

49. The mobile device of claim 48, wherein the controller controls the display to display content on a screen of the mobile device, wherein the content matches the content that is displayed on the smart television.

50. The mobile device of claim 48, wherein the controller controls the display to display the inquiry message of the first user and the inquiry message of the second user on a share window for sharing information with the smart television.

51. The mobile device of claim 49, wherein the controller controls the display to display and overlay the inquiry message of the first user and the inquiry message of the second user on an area that displays the content.

52. The mobile device of claim 50, wherein the controller controls the display to display the share window comprising the inquiry message of the first user and the inquiry message of the second user on a screen of a device, other than the smart television, that is connected with the mobile device.

53. The mobile device of claim 48, wherein the controller controls the communication interface to transmit a connection request to the smart television, and to receive a connection acceptance message from the smart television, in response to the connection request.

54. The mobile device of claim 48, wherein the controller controls the communication interface to request authentication from the smart television with respect to remote control, and to receive a remote control acceptance message from the smart television, in response to the requesting.

55. The mobile device of claim 54, wherein the controller controls at least one of a change of a display position of the content that is displayed on the smart television, a display stop, an adjustment of display speed, a volume adjustment, and a change of display-target content.

56. A non-transitory computer-readable recording medium having recorded thereon a program for executing the method of claim 4.

57. A non-transitory computer-readable recording medium having recorded thereon a program for executing the method of claim 21.

58. A method of sharing, by a mobile device, information with a smart television, the method comprising:

receiving an inquiry message of a first user and related information from the smart television, wherein
the inquiry message of the first user is obtained while content is displayed on the smart television, and
the related information corresponds to at least one image of the content that is reproduced in the smart television and an input occurrence position being a position, relative to a position of the content, on the smart television where a user inquiry occurred, the at least one image being extracted from the content by selecting the at least one image upon determining that the at least one image was being displayed on the smart television at a time at which the first user was inputting the inquiry message or at which the first user ended inputting of the inquiry message, the time having been determined by analyzing an inquiry containing the inquiry message of the first user; and displaying the inquiry message of the first user and the at least one image, using the input occurrence position to display the inquiry message on the mobile device in a similar position, relative to the position of the content, to the position on the smart television where the user inquiry occurred.

59. The method of claim 58, wherein the related information that corresponds to the at least one image comprises an image that is selected based on a point of time at which the inquiry message of the first user is received, reproduction position information of the selected image, sequence information of the selected image, or object information about an object that is comprised in the selected image.

60. The method of claim 58, further comprising reproducing and displaying content on a screen of the mobile device, wherein the content matches the content that is reproduced in the smart television.

61. The method of claim 58, further comprising:
obtaining an inquiry message of a second user that corresponds to the inquiry message of the first user; and
transmitting the inquiry message of the second user, to the smart television.

62. The method of claim 61, further comprising displaying the inquiry message of the first user and the inquiry message of the second user on a share window for sharing information with the smart television.

63. The method of claim 61, further comprising displaying and overlaying the inquiry message of the first user and the inquiry message of the second user on an area that displays the content.

64. The method of claim 58, further comprising controlling at least one of a change of a reproduction position of the content that is reproduced in the smart television, a reproduction stop, an adjustment of reproduction speed, a volume adjustment, and a change of reproduction-target content.

65. The method of claim 58, wherein the image is a frame.

66. The method of claim 4, wherein the inquiry message includes an interrogative sentence.

67. The method of claim 32, wherein the inquiry message includes an interrogative sentence.

* * * * *